(12) United States Patent
Boliek et al.

(10) Patent No.: US 8,769,395 B2
(45) Date of Patent: Jul. 1, 2014

(54) LAYOUT OBJECTS AS IMAGE LAYERS

(75) Inventors: Martin Boliek, San Francisco, CA (US); Edward L. Schwartz, Sunnyvale, CA (US); Michael Gormish, Redwood City, CA (US)

(73) Assignee: Ricoh Co., Ltd., Tokyo (JP)

( * ) Notice: Subject to any disclaimer, the term of this patent is extended or adjusted under 35 U.S.C. 154(b) by 731 days.

(21) Appl. No.: 10/610,841

(22) Filed: Jun. 30, 2003

(65) Prior Publication Data

US 2004/0114814 A1    Jun. 17, 2004

Related U.S. Application Data

(60) Provisional application No. 60/433,296, filed on Dec. 13, 2002.

(51) Int. Cl.
*G06K 9/46* (2006.01)
*G06F 17/30* (2006.01)

(52) U.S. Cl.
USPC ........... 715/209; 715/204; 715/211; 715/243; 715/246; 715/253; 715/273; 715/277; 715/733; 715/741; 715/764; 382/232; 382/233

(58) Field of Classification Search
USPC ........... 345/629, 428; 382/232, 233; 713/182; 715/522, 204, 209, 211, 273, 277, 243, 715/246, 253, 733, 741, 764, 788
See application file for complete search history.

(56) References Cited

U.S. PATENT DOCUMENTS

| | | | |
|---|---|---|---|
| 5,805,747 A | 9/1998 | Bradford | |
| 5,903,272 A * | 5/1999 | Otto | 345/421 |
| 6,011,872 A * | 1/2000 | Qian et al. | 382/243 |
| 6,185,684 B1 * | 2/2001 | Pravetz et al. | 713/182 |
| 6,205,457 B1 * | 3/2001 | Hurwitz | 1/1 |
| 6,466,210 B1 * | 10/2002 | Carlsen et al. | 345/629 |
| 6,498,863 B1 | 12/2002 | Gaidoukevitch et al. | |
| 6,529,218 B2 | 3/2003 | Ogawa et al. | |
| 6,633,674 B1 | 10/2003 | Barnes et al. | |
| 6,650,326 B1 * | 11/2003 | Huber et al. | 345/428 |
| 6,704,024 B2 * | 3/2004 | Robotham et al. | 345/581 |
| 6,720,977 B1 * | 4/2004 | Bourdev et al. | 345/629 |
| 6,748,514 B2 * | 6/2004 | Yoshioka | 712/13 |
| 6,792,154 B1 | 9/2004 | Stewart | |
| 6,839,151 B1 | 1/2005 | Andree et al. | |
| 6,931,534 B1 * | 8/2005 | Jandel et al. | 713/176 |
| 6,937,761 B2 | 8/2005 | Thomas et al. | |

(Continued)

OTHER PUBLICATIONS

'Xerox Research Allows Web Visitors to View Richer, More Colorful Images', Oct. 4, 2002, Xerox, pp. 1-2, http://www.xeroxtechnology.com/ip1.nsf/sedan1?readform&doctype=news10042002.*

(Continued)

*Primary Examiner* — Stephen Hong
*Assistant Examiner* — Wilson Tsui
(74) *Attorney, Agent, or Firm* — Blakely, Sokoloff Taylor & Zafman LLP

(57) ABSTRACT

A method and apparatus for using layout objects or layers are described. In one embodiment, the method comprises accessing information in a JPM file having a plurality of layout objects and generating at least one image using the plurality of layout objects, wherein a first set of at least one of the layout objects of the plurality of layout objects in the image occludes a second set of one or more layout objects in the plurality of layout objects.

58 Claims, 27 Drawing Sheets

(56) References Cited

U.S. PATENT DOCUMENTS

| | | | |
|---|---|---|---|
| 6,977,962 | B2 | 12/2005 | Ohyama et al. |
| 7,206,804 | B1* | 4/2007 | Deshpande et al. ......... 709/203 |
| 7,672,999 | B2* | 3/2010 | Basson et al. ............. 709/206 |
| 2001/0019630 | A1* | 9/2001 | Johnson .................. 382/232 |
| 2002/0021843 | A1 | 2/2002 | Fukuhara et al. |
| 2002/0091665 | A1 | 7/2002 | Beek et al. |
| 2003/0014445 | A1* | 1/2003 | Formanek et al. ........... 707/526 |
| 2004/0095374 | A1 | 5/2004 | Jojic et al. |

OTHER PUBLICATIONS

JPEG2000 Application domains?, Nov 22, 2002, Morgan Multimedia, pp. 1-2, http://web.archive.org/web/20021204193247/www.morgan-multimedia.com/jpeg2000_overview.htm.*

Buckley et al, JPEG 2000 Part 6 FCD 15444-6, Nov. 16, 2001, WG1, pp. 1-13, 33, and 74, http://www.jpeg.org/public/fcd15444-5.pdf.*

Haffner et al, "Browsing through high quality document images with DjVu", publisher: IEEE International forum, pp. 309-318.*

"Information Technology—JPEG 2000 Image Coding Standard," ITU-T Rec. T.800, IS 15444-1, Dec. 2000, pp. 1-27, 29-79, 81-147, 149-167, 169-201, 203-240.

"Facsimile coding schemes and coding control functions for group 4 facsimile apparatus," ITU-T Rec. T.6, Nov. 1998.

"Mixed Raster Content (MRC)," ITU-T Rec. T.44, Study Group-8 Contributions, 1997.

Bottou, L., et al, "Efficient Conversion of Digital Documents to Multilayer Raster Formats," Int. Conf. Doc. Analysis and Recognition, Seattle, WA, pp. 444-448, Sep. 2001.

Bottou, L., et al, "High Quality Document Image Compression with DjVu," J. Electronic Image, pp. 410-425, Jul. 1998).

De Queiroz, R.L., et al, "Optimizing Block-Thresholding Segmentation for Multilayer Compression of Compound Images," IEEE Trans. on Image Processing, vol. 9, No. 9, pp. 1461-1471, Sep. 2000.

Huttenlocher, D., et al, "Digipaper: A Versatile Color Document Image Representation," Proc. Int. Conf. on Image Processing, Kobe, Japan, Oct. 1999.

JBIG—"Information Technology—Coded representation of picture and audio information—Progressive bi-level image compression," ITU-T Rec. T.82, Mar. 1995.

JBIG-2—"Information Technology—Lossy/Lossless coding of bi-level images," ITU-T Rec. T.88, Feb. 2000.

McIntyre, L, "File Format for Internet Fax," IETF FRC 2301, http://www.ietf.org/rfc/rfc2301.text, Mar. 1998.

Mukherjee, C. Chrysafis, "JPEG 2000-Matched MRC Compression of Compound Documents," Proc. Int. Conf. on Image Processing, Rochester, New York, Sep. 2002.

Pennebaker, W.P., et al, JPEG: Still Image Data Compression Standard, Van Nostrand Reinhold, 1993.

Sharpe, et al, "JPEG 2000 .jpm File Format: A Layered Imaging Architecture for Document Imaging and Basic Animation on the Web," Proceedings of SPIE, vol. 4115, 2000, pp. 464-475.

W3C, "Scalable Vector Graphics (SVG)", <http://www.w3.org/TR/SVG>, dated Jun. 22, 2010, 5 pages.

* cited by examiner

Untitled Mask Object      Tile 0     Tile 1

Six Separate Codestreams   Tile 4    Tile 5

Untitled mask object

Codestream 0    Codestream 1

Two Separate Codestreams

Layer 1
(A)

Layer 1+2
(B)

Layer 1+2+3
(C)

Layer 1+2+3+4
(D)

Layer 1+2+3+4+5
(E)

Layer 1+2+3+4+5+6
(F)

LAYOUT OBJECTS AS IMAGE LAYERS

This application claims the benefit of U.S. Provisional Application No. 60/433,296 entitled "JPEG 2000-Like Access Using the JPM Compound Document File Format," filed Dec. 13, 2002.

FIELD OF THE INVENTION

The present invention relates to the field of file formats; more particularly, the present invention relates to accessing coded data using specific file formats.

BACKGROUND

Documents often include not only text, but color, graphics and imagery. These are often referred to as compound documents. Magazines, newspapers, brochures and annual reports have had these attributes for a long time. With the popularity of desktop publishing, color scanners, color printers, color copiers and color digital cameras for the consumer and office markets, the ability to make use of color, graphics and imagery in documents is now commonplace.

There are various compressors for specific image types. These include fax compression technologies such as G3, G4, MMR, and JBIG. Other well-known compression technologies include JPEG.

Some compressors can handle portions of these document efficiently based on their data types. However, many of these compressors cannot handle compound documents well. For example, binary compressors, such as JBIG, provide excellent compression for text that can be characterized as binary. However, such compressors, including the traditional facsimile compression technologies (G3, G4, MMR, JBIG), are insufficient for color images or even grayscale. Similarly, continuous tone compressors, for example, JPEG, are better for natural images with little high frequency information yet wide dynamic range (see W. P. Pennebaker, J. L. Mitchell, JPEG: Still Image Compression Standard, Van Nostrand Reinhold, 1993). However, baseline JPEG does not provide a lossless representation and is not so efficient for sharp edges created by text.

Furthermore, none of these technologies discussed above allows access of lower resolution, progression from lossy to lossless, or access to regions-of-interest. This access is useful for delivering document images from databases or capture devices, to different target devices such as computer and PDA displays, and printers.

Part 1 of the JPEG 2000 standard (referred to as JPEG 2000) is a state-of-the-art continuous-tone image coding system. See "Information Technology—JPEG 2000 Image Coding Standard," ITU-T Rec. T.800 | IS 15444-1, December 2000 and D. S. Taubman, M. W. Marcellin, JPEG 2000 Image Compression Fundamentals, Standards, and Practice, Kluwer Academic Publishers, Boston, 2002. Based on wavelet transform technology followed by bit-plane coding, JPEG 2000 generally provides better rate-distortion performance than the original discrete cosine transform based JPEG coding system. However, the real advantages of JPEG 2000 are the access of different resolutions, progressive bit-rates from very lossy to lossless, access to regions-of-interest, and access to color components. Although JPEG 2000 is capable of reasonable lossless performance on binary images, it is not as good as a dedicated binary image compressor like JBIG or JBIG-2.

Many have been working on the problem of determining how a page image should be segmented for the best rate-distortion. For example, see D. Mukherjee, C. Chrysafis, "JPEG 2000-Matched MRC Compression of Compound Documents" Proc. Int. Conf on Image Processing, Rochester, N.Y., Sept. 2002; R. L. de Queiroz, Z. Fan, T. D. Tran, "Optimizing Block-Thresholding Segmentation for Multilayer Compression of Compound Images," IEEE Trans. on Image Processing, Vol. 9, No. 9, pp. 1461-71, September. 2000; and L. Bottou, P. Haffner, Y. LeCun, "Efficient Conversion of Digital Documents to Multilayer Raster Formats," Int. Conf Doc. Analysis and Recognition, Seattle, Wash., pp. 444-48, September. 2001.

JPM is a new standard file format that has been designed to address these problems. The JPM file format (PEG Mixed Raster Content) is Part 6 of the JPEG 2000 standard. See "Information Technology—JPEG 2000 Image Coding Standard—Part 6: Compound Image File Format," ISO/IEC FDIS 15444-6. The JPM standard is a file format that specifies multiple page collections and pages, multiple objects with object images, mask (binary or alpha), location, scale, and order, and background color. FIG. 1A shows an example of some of the elements of a JPM file, including the merging of JPM objects with image and mask elements.

JPM enables the segmentation of document images into images that are better compressed by different standard image compressors. For example, text and graphic images with high frequency information but little dynamic range are best compressed with a binary coder such as Group 4 ("Facsimile coding schemes and coding control functions for group 4 facsimile apparatus," ITU-T Rec. T.6, November 1998), or JBIG ("Information Technology—Coded representation of picture and audio information—Progressive bi-level image compression," ITU-T Rec. T.82, March 1995), or JBIG-2 ("Information Technology—Lossy/Lossless coding of bi-level images," ITU-T Rec. T.88, February 2000).

JPM has three key features. First, it allows JPEG 2000 coder use. Second, it allows multiple pages and collections of pages to be contained, or referenced, in a single file. Third, it enables a compressed masked imaging system. The JPM file contains "layout objects", which contain a "mask," "image," and attributes such as order (with respect to other objects), scale, position, and cropping (or extent). These layout objects are merged together to form the final "page" image. FIG. 1B shows storing multiple pages of JPM objects with image and mask elements.

JPM is considered by some to be a descendent from the Mixed Raster Content file format often used for Internet-based facsimile. See "Mixed Raster Content (MRC)," ITU-T Rec. T.44, Study Group-8 Contributions, 1998. This standard was used in the IETF facsimile standard ("File Format for Internet Fax," IETF RFC 2301, http://www.ietf.org/rfc/rfc2301.txt, March 1998) and Xerox's Digipaper product (see D. Huttenlocher, P. Felzenszwalb, W. Ruckidge, "Digipaper: A Versatile Color Document Image Representation," Proc. Int. Conf. on Image Processing, Kobe, Japan, October 1999).

Another related technology that preceded JPM is DjVu (see L. Bottou, et. al., "High Quality Document Image Compression with DjVu," J. Electronic Imaging, pp. 410-25, July 1998). This technology is similar to, but not compliant with, Mixed Raster Content. However, it does take advantage of wavelet technology for continuous-tone coding. Another related technology is Scalable Vector Graphics (SVG) standardized by the W3C (see http://www.w3.org/TR/SVG). This technology provides multiple resolutions for objects, but limited options for raster content.

SUMMARY OF THE INVENTION

A method and apparatus for using layout objects or layers are described. In one embodiment, the method comprises accessing information in a JPM file having a plurality of layout object and generating at least one image using the plurality of layout object, wherein a first set of at least one of the layout objects of the plurality of layout objects in the image occludes a second set of one or more layout objects in the plurality of layout objects.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 5 illustrates exemplary metadata which indicates a specific format for the following data.

FIG. 6 illustrates another exemplary metadata for a representation of a shared data entry box with range contents.

DETAILED DESCRIPTION OF THE PRESENT INVENTION

Figure 1A:
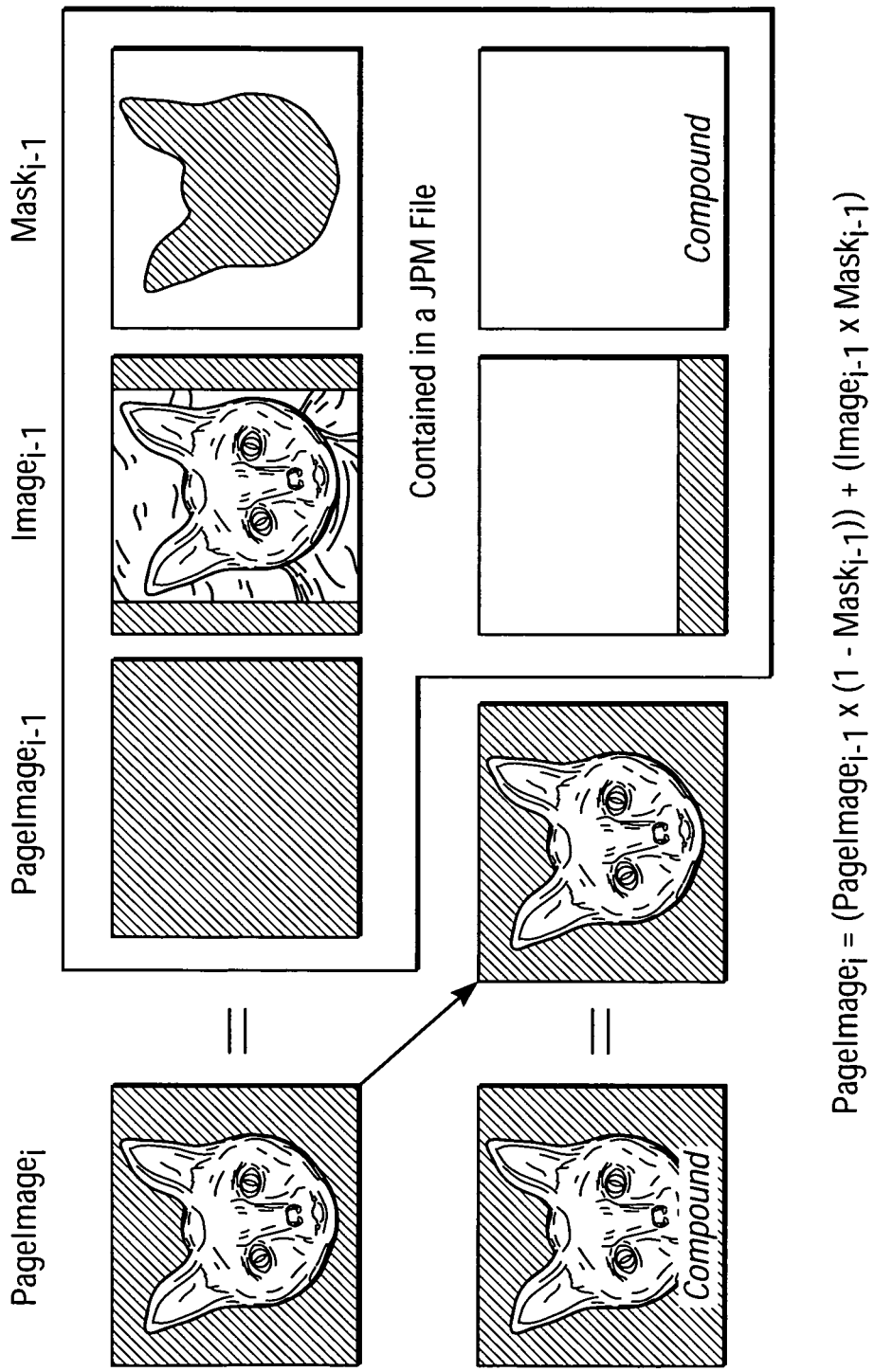
FIG. 1A shows an example of the elements of a JPM file.
Figure 1B:
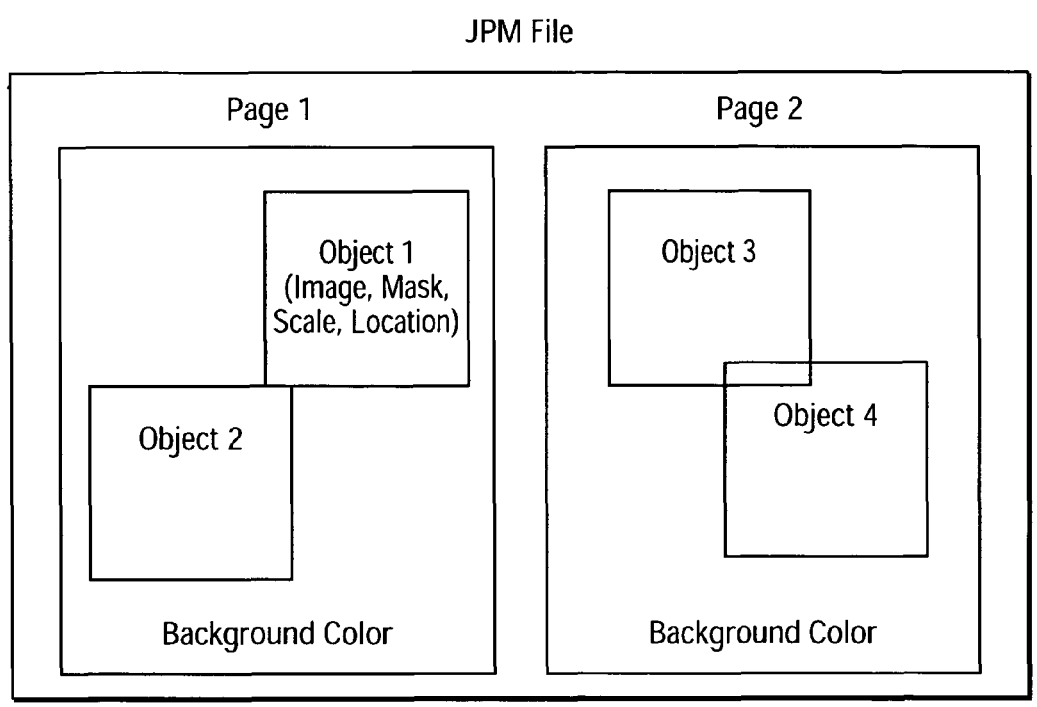
FIG. 1B shows storing multiple pages of JPM objects with image and mask elements.

A method and apparatus for using layout objects or layers are described. Also discussed herein are methods for creating, manipulating, and accessing compound document images (mixture of text, graphics, and images) using standard file formats and compression systems such as JPM (JPEG 2000 Part 6), MRC (ITU.T Rec. T.44), PDF, and SVG. Techniques include ways to achieve progressive access by resolution, progressive bit-rate, region-of-interest. Collections of pages for different display purposes can be created. The character of these undisplayed attributes and features can be described with metadata.

In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

This application describes using JPEG 2000 in conjunction with binary coders with a JPM file. Using these techniques, it is possible to get close to the best rate distortion performance and have access into the JPM file. A description of how to access lower resolutions, regions, and bit-rate progression of the page image is described below, particularly in cooperation with the use of a file format such as JPM. It is the organization of objects, use of redundant objects and codestreams, use of shared data, arrangement of object masks, and use of metadata that contributes to techniques described herein.

Other formats, such as JPEG, could be used with these techniques.

JPM Features

JPM is a multiple page file format that uses an object-based representation of a page, where each layout object has a scale, location, and possibly an object mask and/or an object image. No more than one codestream is associated with an object mask and no more than one codestream is associated with an object image.

A JPM file is made up of boxes. Some of the boxes may contain codestreams. These codestreams may be object images or object masks. Each codestream is encoded with one particular encoder. Since object masks are typically binary, they are typically compressed with a binary compressor (e.g., a JBIG compressor), while images are often continuous-tone and compressed with a continuous tone compressor (e.g., a JPEG 2000 compressor). However, object masks may be continuous tone (contone) and object images may be binary and can be compressed accordingly. The techniques for extending JPEG 2000 access features to the JPM file can be used with any non-JPEG 2000 encoder for either an object mask or image.

Note that the techniques described herein may be used with JPEG 2000. A separate set of techniques is described herein to achieve these features for non-JPEG 2000 type compressors. The application of these techniques is independent of whether the object is an object image or object mask.

Note also that the techniques described herein do not require having a codestream in a box. Indeed, some JPM files have codestreams stored in other files. For example, a box may contain a reference to a file which is not in the box. This file may be a codestream. The reference may also be to a portion (a byte range) of a file.

JPEG 2000 Coding Features

JPEG 2000 is a continuous-tone image compression system designed to provide state-of-the-art compression while also having features like access to lower resolutions, lossy to lossless bit-rate progression, and region-of-interest access. JPEG 2000 takes advantage of a wavelet transformation for multiresolution access, bit-plane coding of the coefficients for bit-rate progression, and tiling, precincts and coefficient shifting for region-of-interest access. JPEG 2000 can be used for the image and/or mask part of an object.

JPM was not designed with these features in mind. It was designed to store multiple pages with multiple objects oriented within a page. There is no inherent scalability in non-JPEG 2000 codestreams. The JPM binary object mask and image architecture does not trivially allow these desirable features. Portions of this disclosure describe techniques to create and access JPM files that allow this type of access.

One technique described herein includes storing some redundant data (e.g., extra pages, extra object masks, extra metadata, extra boxes, etc.) and some non-redundant data (e.g., JPEG 2000 compressed images) to allow progression and manipulation of a JPM file. In this way, the JPEG 2000 features are preserved.

Access Features

JPEG 2000 allows many different types of access to the codestream. A number of these access features may be used to achieve JPEG 2000 type access when a codestream is stored in a JPM file. That is, when both JPEG 2000 and non-JPEG 2000 codestreams are stored in a JPM file, some of the same types of access that are permitted to JPEG 2000 codestreams using standard JPEG 2000 decoders are available. Note that this access may be independent of how the codestream is stored.

The access features described below are based on dividing up one or more codestreams in a known manner and creating a legal JPM codestream that may be operated upon by a "dumb decoder" or standard decoder to produce a default output image or by a "smart decoder" that is able to take advantage of how the codestream(s) are arranged inside the file to provide a desired output image that is one of multiple possible output images. A dumb decoder is a decoder that is capable of handling a standard compliant JPM file, but not capable of using the techniques described herein. A smart decoder is a decoder that is capable of handling a standard compliant JPM file in addition to being able to handle other features.

Note that, in one embodiment, a dumb decoder may be able to decode data that is contained in a JPM file created for decoding by a smart decoder; however, the dumb decoder is likely to ignore some of that data for the purpose of rendering.

Resolution Access with Redundant Object Masks

JPEG 2000 files allow access to resolutions that differ in size by powers of 2. For JPEG 2000, if an individual desires a lower resolution image, the packets in the codestream corresponding to the lower resolution sub-bands may be taken in a manner well-known in the art and described in the JPEG 2000 standard. The number of resolutions available depends on the number of decompositions performed.

There are coders allowed by the JPM file format that produce codestreams that cannot be accessed as flexibly as JPEG 2000. Some disallow progression by resolution, others progression by bit-rate, some have no special access at all. To compensate for these codestream limitations, selected redundant codestreams can be added to the JPM file. With these extra codestreams, and the metadata added to describe them, JPM files can offer the same access features as a JPEG 2000 file.

More specifically, in one embodiment, a decoder receives a command to provide an output image at a particular resolution. The command may come from an application program, a command line interface, a user interface, a parser, or any other well-known command generator. In response to the command, the decoder accesses a JPM file and locates the object masks corresponding to the requested resolution and decodes it. In one embodiment, the decoding may be performed using a JBIG decoder. Similarly, the decoder accesses only that portion of the JPEG 2000 codestream necessary to obtain object image at the desired resolution in a manner well-known in the art for JPEG 2000 processing.

In one embodiment, to obtain better compression performance, most object masks and some object images may be better compressed with a binary compressor. To achieve lower resolution, in one embodiment an object mask is decoded and scaled to the correct size. To do this, it is important to match the downsampled object mask to the downsampled object image for the best reconstructed object. Decoding a large image and then scaling it to smaller size is less efficient than decoding a small size image.

Figure 2A:
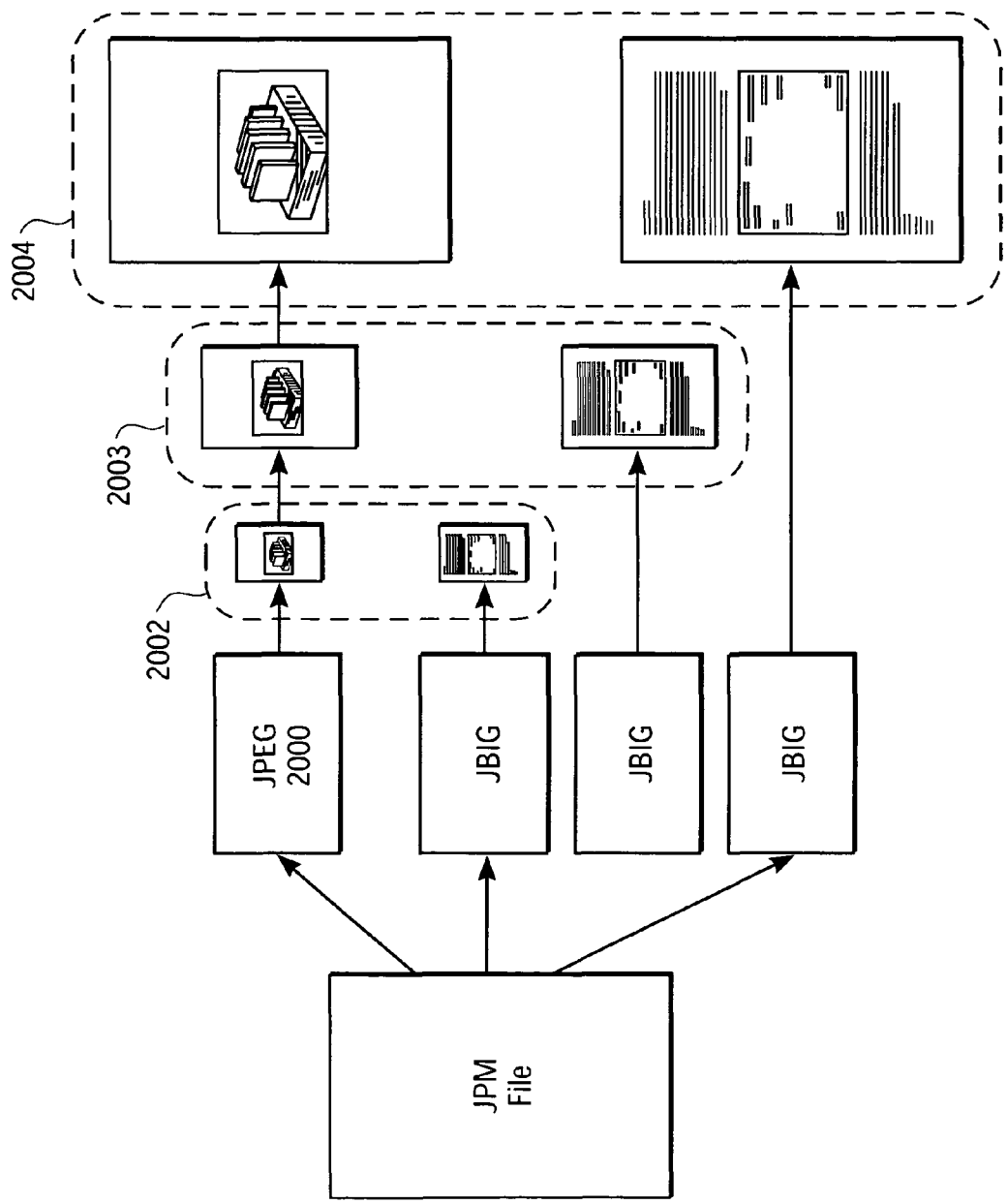
FIG. 2A illustrates a redundant binary mask for resolution progression.

For faster access and to be able to be decoded by standard decoders, it may be desirable to have redundant versions of the binary object mask. (Similarly, redundant versions can be used for binary object images and non-binary object images and/or masks coded with techniques other than JPEG 2000.) FIG. 2A shows an example resolution access to three resolutions with the JPEG 2000 image codestream. In one embodiment, different resolutions are all available by storing multiple binary (e.g., JBIG) codestreams in a JPM file. In one embodiment, these are redundant binary object masks and only differ in resolution. In one embodiment, to create three resolutions for the object mask, three JBIG codestreams are used. Referring to FIG. 2A, JPEG 2000 resolution progression enables access to various resolutions from the same codestream using a JPEG 2000 decoder. The resulting outputs are data for images represented as images 2002, 2003, and 2004. These are created in a manner well-known in JPEG 2000 by accessing the JPEG 2000 codestream to a certain decomposition level using the correct headers associated with data in a manner well-known in the art. There is also a unique JBIG codestream at each resolution in the JPM file. To obtain the desired resolution, only the JBIG codestream for the desired resolution is obtained from the file and decoded. Note that in one embodiment, the object image in fthe JPM file in FIG. 2A is the JPEG 2000 codestream while the JBIG codestreams represent redundant versions of the object mask. The background image is set to white. Of course, any colors may be used for a mask or an image object.

The JBIG standard provides for encoding many resolutions for one codestream with the lower resolution appearing in the codestream first and being independently decodable. This can be used to reduce the number of codestreams to $$\left\lceil \frac{\text{num\_res}}{\text{num\_res\_in\_JBIG}} \right\rceil.$$

Figure 2B:
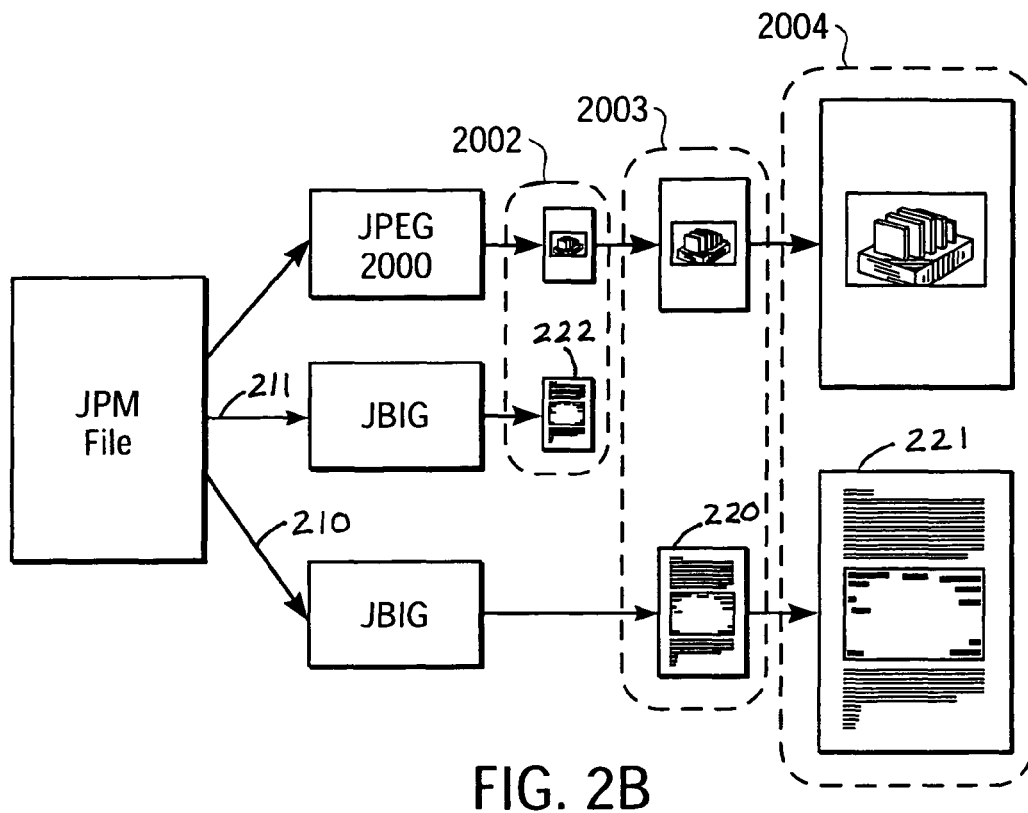
FIG. 2B illustrates resolution access with JBIG resolution reduction.

This is shown in FIG. 2B. Referring to FIG. 2B, two JBIG codestreams are used. The first JBIG codestream 210 corresponds to images 220 and 221, while the second JBIG codestream 211 corresponds to image 222. These can be used to reduce redundant codestreams.

A smart decoder accesses only the object mask codestreams and the JPEG 2000 codestream resolution necessary to reconstruct the desired image in order to generate an image at the desired resolution. Such a smart decoder may know which object mask is which in the JPM file by using metadata in the JPM file. Alternatively, a non-metadata way to arrange object masks in resolution order may be used. For example, a parser (e.g., a JPEG 2000 parser) may be used to create all the information such that, for example, a decoder knows which object mask is which. Alternatively, there may be an agreed upon convention that objects appear in a particular order and that way a decoder is identifying parts of a JPM file.

Page box and page collections may also be used to inform a smart decoder about which object mask is which in a JPM file.

Region of Interest (ROI)

There are two basic types of ROI, predetermined ROI (at encode time) and user interactive (on the fly, at decode or transmission time). Predetermined ROI is supported in the JPEG 2000 codestreams by the ROI coefficient shifting functions (see JPEG 2000 Part 1). A JPEG 2000 codestream is prepared in this way can be placed in a JPM codestream.

Normal JPEG 2000 bit-rate progression exposes and refines the ROI areas before the background. This may be implemented by having a self-masking JPEG 2000 codestream with an ROI. In this case, the mask of the object would be fully rendered and the image represented by the JPEG 2000 codestream, would progressively render the ROI.

Another way to execute predetermined ROI in JPM is to create layout objects that correspond to the ROI. That is, using layout object ordering, a number of layout objects, n, that fit into the region of interest, where n is greater than or equal to one, and a smart decoder that stops decoding after the region of interest or sets up a page to only contain that region of interest. These objects would be called out first in the Page box. In this case, both the mask and image of the object are fully rendered before the next object is rendered.

In another embodiment, the other method of ROI is interactive with the user. Perhaps the user desires to zoom or pan around an image. To facilitate this functionality, the document is "tiled" into adjacent rectangular and regular objects. The binary object mask is divided into the correct independent codestreams for each "tile" (with perhaps redundant codestreams for different resolutions, etc.). The image portion for all tiles may be provided by a single JPEG 2000 codestream. This codestream might be divided into multiple tiles corresponding to the tiles used in separate layout objects. The JPEG 2000 codestream may be divided using a fragment table and SDE or Media Data boxes. Thus, objects are used as tiles.

Finer grain access to binary object images or masks can be provided by splitting the binary image into different layout objects. Each layout object contains a complete codestream, but only for a small portion of the image. The smart JPM decoder will not access those layout objects that lie outside the region of interest. A single JPEG2000 codestream is tiled and each tile is accessed for a different image object. The corresponding mask object could be created by tiling the object mask and having separate codestreams, one for each tile object. A "tiled" JPM file can be created by mapping objects to tiles and tiles to objects. A JPEG 2000 codestream can be regularly tiled (and/or divided into precincts). This is not the case with most binary compressors. To achieve tiling for binary codestreams, whether or not these codestreams are associated with JPEG 2000 tiled codestreams, the binary images can be tiled before compression and the individual streams stored as separate objects. That is, for a non-JPEG 2000 codestream, the codestream is divided up into tiles and each tile is separately encoded into separate codestreams.

Figure 3A:
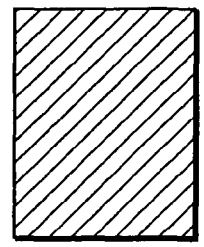
FIG. 3A illustrates tiled binary masks for region-of-interest access.
Figure 3A:
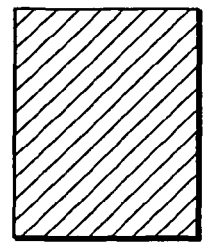

FIG. 3A shows region of interest access with tiles. A decoder accesses only the object mask codestreams and the JPEG 2000 codestream tiles necessary to reconstruct the desired image. Referring to FIG. 3A, a number of tiles are shown (0, 1, 2, 3, 4, 5), where the object mask is divided into multiple codestreams. In the JPM file, each of the tiles is a layout object. Numerous layout image objects are derived from one tiled JPEG 2000 codestream. The masks are a number of individual non-JPEG 2000 codestreams. Thus, the decoder provides region of interest access with binary codestreams. Note that a standard decoder decoding this JPM, the output image would still be the full image, not the region of interest, while a smart decoder decoding this JPM file could obtain the region of interest.

When a standard decoder without knowledge attempted to display, for example, the upper left corner of a page, it would render the entire page in memory, and then only copy the upper left corner to the screen. This is inefficient because all layout objects and codestreams must be accessed and decoded. A smart decoder would only access the necessary layout objects, which intersect the upper left corner. Any layout objects and the corresponding codestreams that only affect other portions of the page need not be accessed and decoded.

If a layout object that intersects the region of interest contains a JPEG 2000 decoded. For example, if the JPM decoder is decoding the upper left corner of a page and there is a layout object of an image covering the entire page, only those tiles of the JPEG 2000 image which will be on the upper left corner of the page once decoded and rendered need to be accessed.

JBIG and the other binary codestreams do not provide random access to tiles. JBIG codestreams do allow banding or striping, that is random access to portions of the image that are the width of the page, but some limited number of lines high. In this case, an advanced decoder could just access the bands that intersect the region of interest. This is likely to be more efficient than decoding the entire codestream, but less efficient than accessing tiles.

Figure 3B:
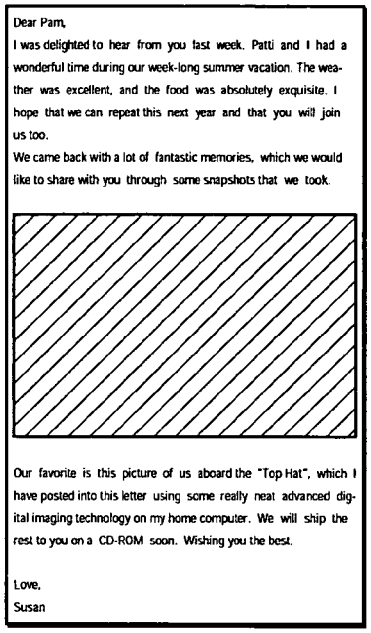
FIG. 3B illustrates region of interest access with banded and tiled binary (JBIG) codestreams.
Figure 3B:
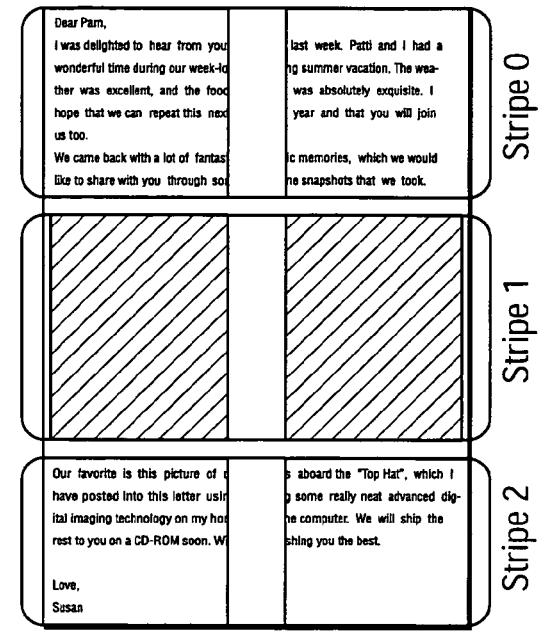

FIG. 3B illustrates the use of banding. Referring to FIG. 3B, an image 320 is divided up vertically into two codestreams, labeled codestream 0 and 1. Then banding may be used to divide each of codestreams 0 and 1. In FIG. 3B, each codestream is divided into three bands (or stripes), labeled strip 0-2. These may be considered tiles. The object image or object mask may be handled in this manner.

The banding allowed in JBIG may be combined with splitting a binary image into separate layout objects. Thus, as shown in FIG. 3B, an image can be divided into 6 layout objects (called tiles in FIG. 3B). This provides random access in one dimension. Each of those codestream in those layout objects can be banded, providing access in the other dimension.

Note that the division of binary object images and masks into smaller portions may be most efficient if it matches the tiles in a JPEG 2000 codestream for the same region, but this is not necessary. In fact, the binary object could be divided into overlapping layout objects.

Rate Control and Progression

JPEG 2000 offers bit-rate progression. For JPM files that are dominated in size by JPEG 2000 codestreams as is usually the case, the rate control for JPEG 2000 can be used for JPM rate control. For example, in the case of a JPM file with two JPEG 2000 codestreams, a certain rate allocation may be made between the two in a manner well-known in JPEG 2000. On the other hand, if there are binary codestreams in JBIG multiple resolution or JBIG-2 lossy/lossless, then there is discardable data and other rate control is possible such as is described below.

Figure 3C:
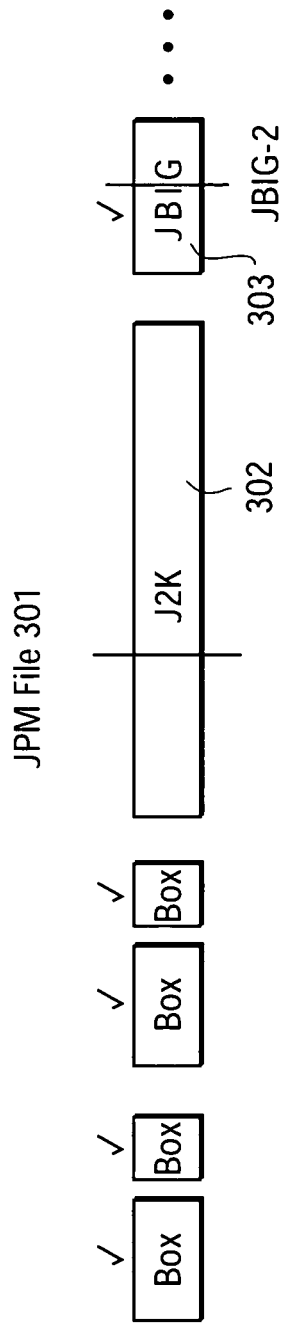
FIG. 3C illustrates a JPM file with division into boxes.

FIG. 3C illustrates an exemplary JPM file. Referring to FIG. 3C, JPM file 301 includes a number of boxes. These boxes include boxes that store metadata, portions of a JPEG 2000 codestream and portions of a JBIG codestream. Note that there is a substantially larger amount of JPEG 2000 codestream 302 than the other portions of the JPM file, such as JBIG codestream 303. In one embodiment, a command may be given that limits the size of the JPM file to a specified size. The size can be user or application specified. In such a case, all the boxes of JPM file 301 other than those containing the portions of JPEG 2000 codestream 302 are processed further (e.g., sent, prepared to be sent, stored, etc.) and then JPEG 2000 codestream 302 is truncated, potentially to fit in the remaining bandwidth that is available if the codestream 302 is being sent. That is, all of the JBIG codestream 303 is stored before any of JPEG 2000 codestream 302 and then depending on the remaining available bandwidth a portion of JPEG 2000 codestream 302 is stored. This is possible because of the progressive nature of the JPEG 2000 codestream. Thus, portions of the JPEG 2000 codestream are sent until the allowed rate is reached.

Some limited binary progression is also enabled by the two-stage codestream of the JBIG-2 coder (codebook lookups followed by difference image). In such a case, this codestream could also participate in rate control and discard the different image for one layer of bit-rate progression.

Likewise, the resolution reduction allowed by the JBIG compressor allows some progression. The high resolution data can be discarded and the low resolution data interpolated.

More specifically, in one embodiment, the JPM file includes many SDE boxes. In the JPM file, since all the essential elements of a JPEG 2000 codestream are available, the codestream may be divided and wrapped in individual Shared Data Entry (SDE) boxes. Each box may contain a single packet, a tile-part, or some other useful structure corresponding to resolution, tile, progression layer or all of the above. Each of these SDE boxes may be referred to in order to access it in a certain order.

Figure 3D:
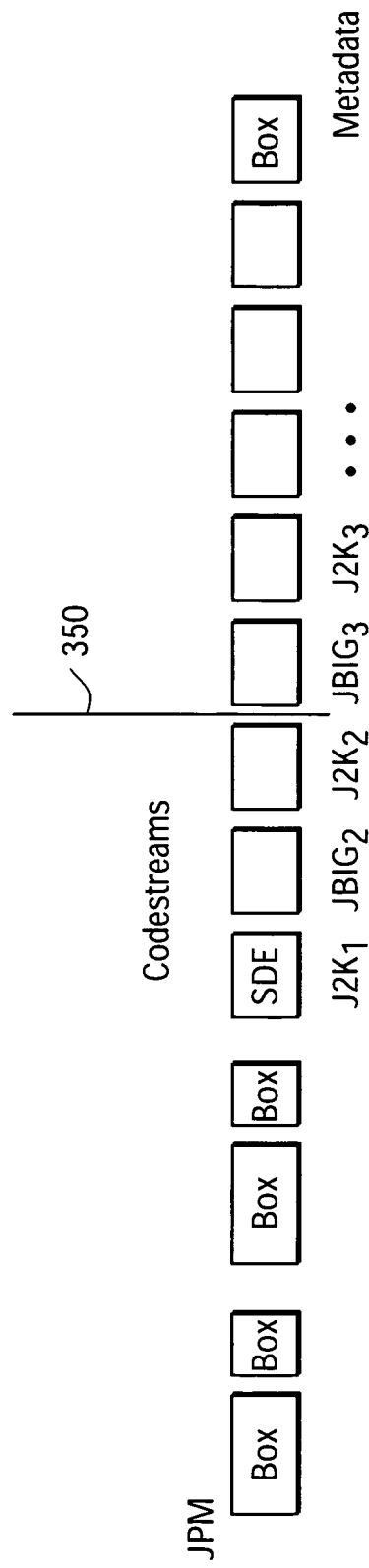
FIG. 3D illustrates another JPM file in which boxes are arranged to facilitate progressive processing.
Figure 4:
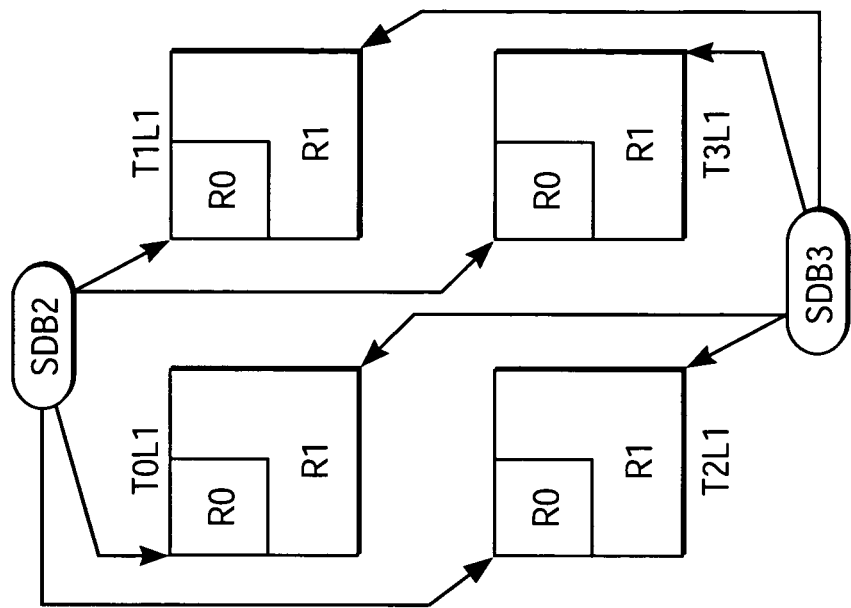
FIG. 4 illustrates JPEG 2000 codestream organization with shared data boxes.
Figure 4:
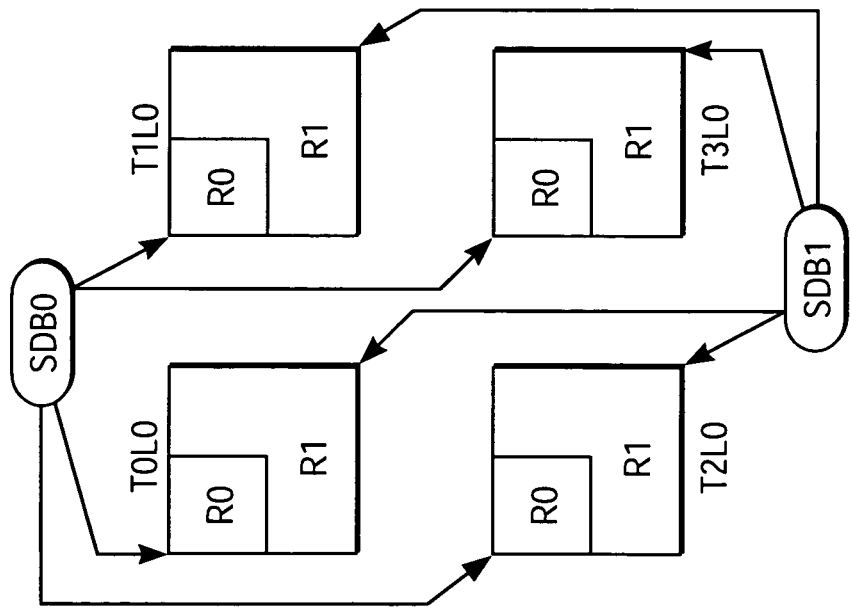

FIG. 3D illustrates an exemplary JPM file. Five of the SDE boxes may contain, for example, a first JPEG 2000 part ($J2K_1$), a first JBIG-2 part ($JBIG2_1$), a second JPEG 2000 part ($J2K_2$), a second JBIG-2 part ($JBIG2_2$) and a third JPEG 2000 part ($J2K_3$). The boxes can be arranged to allow the JPM file to be progressive such that as the JPM file is being processed and when a particular portion of the file has been reached, for instance, after sending a predetermined amount of the file, the remainder of the JPM file is truncated. In FIG. 3D, line 350 illustrates a truncation point in which the boxes to the left of line 350 are sent (or processed) and the boxes to the right are truncated.

Component Access

It is possible to extract certain components only. For example, in one embodiment, only the luminance component is extracted from a JPEG 2000 file. The color could be determined according to the application by accessing the Base Color box. A RGB (red, green, blue) background color may be converted to a lumience only color. That is, when putting the object mask and luminance image together, only a black and white image (gray scale) is then produced. This may be useful when printing to a black and white printer.

In another example, the luminance of an object and the luminance of a colored background may be extracted and combined using an object mask. Thus, a component may be extracted from a JPM file to enable access to components normally available only to a JPEG 2000 parser operating on a JPEG 2000 codestream.

Codestream Storage in a JPM File

One JPEG 2000 codestream can contribute to several objects. A codestream may be broken down to facilitate parsing. The broken down codestream may be in the JPM file in a manner that facilities parsing. In a JPM file, a JPEG 2000 codestream must either be contained in a Continuous Codestream box, or pointed to by a Fragment Table box. The fragment table allows the codestream to be stored in multiple places in the file and other box types.

In another embodiment, the fragment list, or table, allows fragments to be entered in such a way that when the fragments are associated with each other, a parsed codestream is formed. The fragment table points to parts or the codestream that are to be "grouped" together. In one embodiment, in order to modify a codestream, only the fragment table need be modified.

The shared data reference boxes may point to a specific shared data entry boxes, while a fragment table uses lengths and offsets to point to specific parts of the JPM file. By making changes in the fragment table or to shared data reference boxes, a new output may be generated from the JPM file. This new output does not require a parser for its generation. Thus, one can throw away those parts of the codestream that are not going to be used in the future since they are not referenced. This could be done by a consolidator function, such as is described in more detail below.

The SDE box may contain any part of a JPEG 2000 codestream, only one tile-part, or only one packet. A tile-part can contain a number of packets from a given tile. The location and progression of tile-parts are well defined in the JPEG 2000 codestream. However, the image data represented and the packets contained in the tile-parts are not fully constrained by the JPEG 2000 standard. The encoder has many choices.

In one embodiment, all codestreams may be non-JPEG 2000 codestreams with tile-resolution association and may be stored in SDE boxes and listed in fragment tables. In one embodiment, a JBIG-2 codestream may include a lossy image and a remainder image in two separate SDE boxes. In another embodiment, JBIG has a mode where there is an image of low resolution and a high resolution remainder.

Metadata for informating a Parser of Codestream Parts and Meaning

Metadata may be used to describe the JPM file to the parser or a smart decoder. In one embodiment, metadata is used to describe how the codestream has been divided into SDE boxes. In one embodiment, the metadata is located in the beginning of a JPM file. However, this is not a requirement for the metadata may be located anywhere in the JPM file or in many places in the JPM file.

Note that this metadata is not strictly needed by a parser. A JPM parser could receive a JPM file, extract the codestreams, and then use a conventional JPEG 2000 parser to divide up the codestreams so that only those parts desired by a user remain. Other methods, even complete decoding, could be used. However, this process would be slower than with informative metadata.

Index of SDE Signals Content

There are a number of ways to explain what codestream data is present and which SDE box it is in. The index values of the SDE boxes may be used to indicate what parts of the codestream are contained in those boxes. Then the SDE Boxes present (or the ranges) can be signaled in metadata as described in more detail below. Also, metadata can explicitly describe the contents of each SDE Box.

A "smart" or non-standard decoder could use one or more indices may be used to gain access to the codestream without use of the fragment table. Each SDE box has its own index. The indices may be in any order. In one embodiment, the index can be any number; however, the selection of indices may enable the indices to indicate which packets (or tile-parts) are contained in a SDE Dox.

SDE Box Index Value

Using a shared_data_ID as the descriptor for the codestream packet information is one technique for selecting a unique ID for SDE box. Use of this technique results in the selection of a unique ID number for SDE box and shared data reference box could be selected so that a packet data of a JPEG 2000 codestream for a given tile, resolution, layer and component can be identified.

Alternately, a tile-part could be contained in the SDE box and described by the index. There are a number of ways to explain what codestream data is present and which SDE box it is in. The index values of the SDE boxes may be used to indicate what parts of the codestream are contained in those boxes. Then the SDE Boxes present (or the ranges) can be signaled in metadata as described in more detail below. Also, metadata can explicitly describe the contents of each SDE Box.

Each SDE box has its own index. The indices may be in any order. In one embodiment, the index can be any number; however, the selection of indices may indicate which packet is in the SDE box.

There are a number of types of codestream data to associate with SDE index values. First, JPEG 2000 codestream packets (tile, resolution, layer, component, precinct) representing image data, are mapped to the SDE index. (Note that precinct=0 for all these examples.)

Second, the main header (first tile-part headers with no data) are put into some SDE boxes. The right tile-part headers are needed to understand the packets contained in a SDE box. Because tile-part headers map to possibly several packets, more information is needed to describe the patents.

Finally, the binary mask data (tile, resolution) is mapped to SDE boxes. The index mapping is found in Table 1.

TABLE 1

Rough SDE index map

| Data type | SDE index |
|---|---|
| All binary codestreams (such as JBIG) (i = 0 to m) | 0 + i |
| First for each J2K packet (j = 0 to n) | 65 535 − j |
| All first tile-part headers (just 1 SDE) | 65 535 − n − 1 |
| Main headers (just 1 SDE) | 65 535 − n − 2 |

Binary Codestream (Mask) to SDE Index Mapping

In one embodiment, the number of object masks for tiles required is the number of tiles multiplied by the number of resolutions. The index number for the object masks in this example are numbers counting up from the zero.

The pseudo code below describes one embodiment of a process for assigning index numbers for binary codestreams.

```
offset[0]=0;
for(i = 0; i < codestreams; i++)
{
    for(tile = 0; tile < num_tile[i]; tile++)
    {
        for(resolution = 0; resolution < num_res[i]; resolution++)
        {
            var = tile * num_res[i] + resolution;
            index_mask[i][var] = offset[i] + var
        }
        offset[i+1] = var + offset[i];
}
```

These example results show the corresponding binary codestreams related to the object masks. Note that these codestream only have tiles and resolutions.

Binary Codestream 0
  SDE index=0 tile=0 res=0
  SDE index=1 tile=1 res=0
Binary Codestream 1
  SDE index=2 tile=0 res=0
  SDE index=3 tile=1 res=0
  SDE index=4 tile=2 res=0
Binary Codestream 2
  SDE index=5 tile=0 res=0
  SDE index=6 tile=0 res=1
  SDE index=7 tile=1 res=0
  SDE index=8 tile=1 res=1

J2K Packet to SDE Index Mapping

Use of this technique results in the selection of a unique ID number for SDE box and shared data reference box could be selected so that a packet data of a JPEG 2000 codestream for a given tile, resolution, layer and component can be identified.

The pseudo code below describes one embodiment of a process for assigning index numbers for JPEG 2000 codestream packets. This technique works for multiple codestreams.

```
offset [0] = 0
for(i = 0; i < Codestream; i++)
{
    for(tile = 0; tile < num_tile[i]; tile++)
    {
        for(resolution = 0; resolution < num_res[i]; resolution++)
        {
            for(layer = 0; layer < num_layer[i]; layer++)
            {
                for(comp = 0; comp < num_comp[i]; comp++)
                {
                    var=tile*(num_comp[i]*num_layer[i]*
                    num_res[i])
                        +resolution*(num_comp[i]*num_layer[i])
                        + layer * num_comp[i] + comp;
                    index[i][var] = offset[i] + var;
                }
            }
        }
    }
    offset[i+1]=offset[i]+num_tile[i]*num_comp[i]*num_layer[i]*
    num_res[i];
}
```

Constraint: offset[i]=the start of indexes for codestream i
  var=an identifier for the packet within the codestream
where num_code=the number of codestreams in the JPM file,
index[i] [var]=Shared Data Entry Box index number
i is the index which counts the number of codestreams from 0 to num_code,
num_tile[i]=the number of tiles in codestream i,
num_res[i]=the max number of resolutions in codestream i,
num_layer[i]=the max number of layers in codestream i, and
num_comp[i]=the number of components in codestream i.

Below is a specific example showing SDE box index numbers generated using the algorithm for 3 codestreams. The first codestream has 2 tiles and 1 resolution. The second codestream has 3 tiles and 1 resolution. The third codestream has 2 tiles, 2 resolutions. The corresponding index numbers are shown for object masks, main header and tile headers. Note that the component and layer do not change the object mask size. The same object mask could be used for different layers and different components.

JPEG 2000 Codestream 0 (2 packets)
  SDE index=65535 layer=0 tile=0 resolution=0
  SDE index=65534 layer=1 tile=1 resolution=0
  tileheader SDE index=65532
  mainheader SDE index=65533
JPEG 2000 Codestream 1 (3 packets)
  SDE index=65531 layer=0 tile=0 resolution=0
  SDE index=65530 layer=1 tile=1 resolution=0
  SDE index=65529 layer=2 tile=2 resolution=0
  tileheader SDE index=65527
  mainheader SDE index=65528
JPEG 2000 Codestream 2 (4 packets)
  SDE index=65526 layer=0 tile=0 resolution=0
  SDE index=65525 layer=1 tile=0 resolution=1
  SDE index=65524 layer=2 tile=1 resolution=0
  SDE index=65523 layer=3 tile=1 resolution=1
  tileheader SDE index=65521
  mainheader SDE index=65522

The main headers and tile headers are interleaved with the codestreams in this example.

Alternatives for Packing Main and Tile Headers

There are a number of ways to store and access tile headers. If the tile headers are limited to contain only SOT and SOD markers, then every tile header is 14 bytes long. Packing in a single SDE in a given order allows deterministic extraction. There are several ways to order the tile headers. One example is to have the Resolution 0 tile header for Tile 0 first, then the Resolution 1 tile header for Tile 0 and Resolution 2 tile header for Tile 0. The same order for Tile 1 follows.

If the tile headers have variable length, the appropriate tile headers are packed in a single SDE in a given order, they may be extracted based on the sequential order by finding the required SOT and SOD JPEG 2000 marker segments.

Similarly multiple main headers can be placed in one SDE box in a given order. For example Resolution 0, Resolution 1 and Resolution 2. Main headers can be identified with the SOC marker segment.

Tile-Part to SDE Index Mapping

If instead of packets the intention is to store tile-parts in the codestream, then only the tile number and the tile-part number need be mapped to the SDE index. The pseudo code below may be used as one embodiment of such a process.

```
offset[0] = 0;
for(i = 0; i < Codestream; i++)
{
    for(tile = 0; tile < num_tile[i]; tile++)
    {
        for(tile-part = 0; tile_part < num_tp[i]; tile_part++)
        {
            var = tile * num_tp[i] + tile_part;
```

```
            index[i][var] = 65535 - (offset[i]+tile*num_tp[i]+
            tile_part);
        }
    }
    offset[i+1] = var + offset[i] + 1;
}
```

JPEG 2000 Codestream 0
   SDE index=65 535 tile=0 tile-part=0
   SDE index=65 534 tile=0 tile-part=1
   SDE index=65 533 tile=1 tile-part=0
   SDE index=65 532 tile=1 tile-part=1
JPEG 2000 Codestream 1
   SDE index=65 531 tile=0 tile-part=0
   SDE index=65 530 tile=0 tile-part=1
   SDE index=65 529 tile=1 tile-part=0
   SDE index=65 528 tile=1 tile-part=1

Here the main headers and tile-part headers can be contained in the SDE without the loss of random access.

Media Box for the Codestream and Metadata Storage

Throughout this disclosure meta data and codestream data is described as being stored in primarily in two types of boxes: Free boxes and Shared Data Entry boxes (SDE). There are significant advantages to using the Media boxes instead for these functions.

The original intent of Free boxes was that data in a box that was no longer needed (perhaps because of an editing operation) could be removed by replacing the box with a free box, and writing new data at a different location in the file. This enables an editor to avoid rewriting the entire file to remove bytes from the middle. There is an expectation that an editor may at it's option rewrite a file and remove all Free boxes as a form of "garbage collection" and that this will not affect the rendering of the file.

For some of the techniques described here, removing the Free boxes will change the capabilities of the file. For example, removing the Free boxes may remove the alternative codestreams or page boxes that were stored to provide different resolutions. However, the rendering produced by a standard JPM decoder is unchanged.

Instead of using Free boxes for the extra information, Media Data boxes may be used. In this case a generic JPM decoder will typically not remove the information under a "garbage collection" operation. Thus an encoder may influence what a standard decoder is likely to do with the information it doesn't understand, by choosing which type of box to store the data in. In all cases in this text where a free box is used a media data box could be used instead.

The original intent of Shared Data Entry boxes is to replace complete boxes that might appear multiple times in a JPM file. Shared Data Entry boxes have been used extensively in the techniques of this document to store codestreams that may later be "parsed". That is, an application may wish to go through the file and remove some of the boxes and leave others based solely on the index number and not requiring the decoding of any information within the SDE box. Unfortunately, because there is only a two byte index in a SDE box there is a limit on the number of codestreams and pieces of the codestream that can be stored in this way. Further, it is possible that a generic editor might remove a SDE box because there is no SDR box in the file which points to the SDE box. Both of these problems can be overcome by using a Media Data box.

The Media Data box does not explicitly contain an index. However, because the contents of a Media Data box are completely arbitrary it is easy to add an index. The index could be much longer and have separate fields for codestream, tile, or precinct number which where combined into one index number in order to use the SDE box.

A good technique for using Media Data boxes would be to begin each box with some indication of the type of information in a UUID box as defined in Part 1 of the JPEG 2000 standard. Alternatively, the following syntax for associating tile, resolution, layer, and component could be used before the codestream data.

Metadata Boxes

T Metadata is required for a smart decoder or a parser to know what data is in the file, where it is, and how it is organized. Metadata itself can be presented in many ways using various stenographic and other data hiding techniques.

Described here, however, is a syntax for a number of markers describing such things as the mapping between codestream parts and the SDE boxes that contain them, the character of page collections, and rate-distortion information. These markers are contained in metadata boxes such as for example, the free box, the MDAT (media) box, etc., and are not strictly needed for decoding or parsing.

Table 2 shows the function of these markers, an identifier, and the type of data used to describe the markers. The identifier is just an example of an ASCII string that might be used.

TABLE 2

Metadata markers

| Metadata marker | Example identifier (ASCII) | Type of data |
|---|---|---|
| SDE present, indexed contents | SARAHJPM00 | none or index list |
| SDE present, range contents | SARAHJPM01 | range array of indexes |
| SDE present, explicit contents | SARAHPM02 | range array of packets |
| SDE present, explicit contents, tile-parts | SARAHPM03 | range array of packets |
| Multiple page description | SARAHJPM04 | various range arrays |
| Media box description | SARAHJPM05 | range arrays |
| Layering description | SARAHJPM06 | various range arrays |
| Map element description | SARAHJPM07 | types |

SDE Present, Indexed Contents

Figures 5, 6:
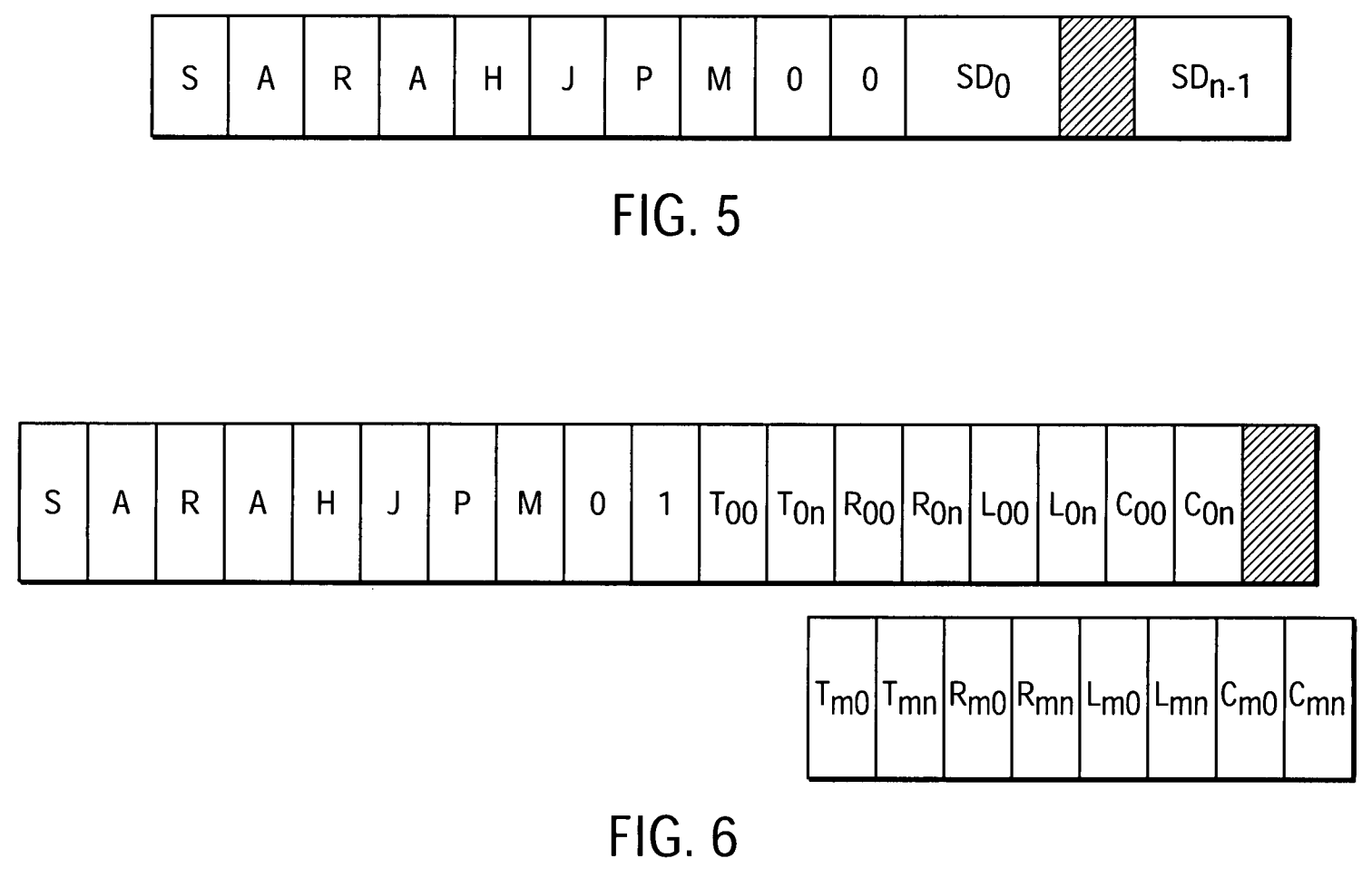

The presence of the "SDE present, indexed contents" marker implies that certain SDE boxes are used for codestreams or codestream parts and that the SDE indices signal the codestream parts. There may be no data other than the identifier, or the index numbers of the SDE boxes present may be listed (in any order). FIG. 5 shows this syntax for metadata for when an SDE is present with indexed contents (e.g., codestream parts). Note that the precision of an SDE Box index is two bytes. Referring to FIG. 5, the following is used: SDEJ The index number of the SDE boxes present. There are n SDE boxes described by this marker.

SDE Present, Range Contents

The presence of the "SDE present, range contents" marker implies that certain SDE boxes are used for codestreams or codestream parts and that the SDE indices signal the codestream parts. There may be no data other than the identifier, or the range index numbers of the packets contained in the SDE boxes present may be listed. FIG. 6 shows the syntax for metadata for when an SDE box is present and ranges for packets contained in the SDE boxes.

The beginning and ending values for the four dimensional array are given for each run of packets. There can be as many runs of packets as needed. Note that the precision of an SDE Box index is two bytes. Note that in this example each value in the range is limited to 8 bits (0-255). Other sizes could be chosen for each field either limiting it in different ways or not at all. Note that for describing masks or binary images the range of the layers and components will always be 0 to 0. Also note that the range of precincts could be added to this syntax and all the other markers as well.

Referring to FIG. 6, the following are used:

| | |
|---|---|
| $T_i$ | Beginning and ending tile number. |
| $R_i$ | Beginning and ending resolution. |
| $L_i$ | Beginning and ending layer. |
| $C_i$ | Beginning and ending component. |

SDE Present, Explicit Contents

Figure 7:
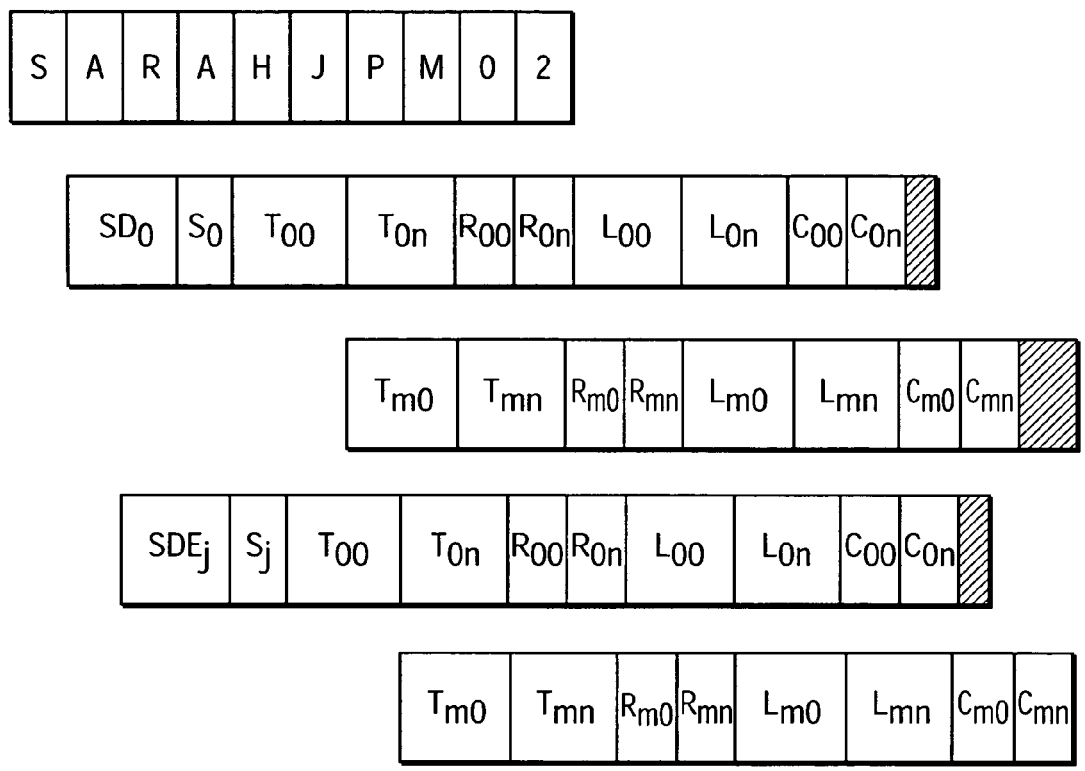
FIG. 7 illustrates yet another exemplary metadata for a representation of a SDE box with explicit contents.

The presence of the "SDE present, explicit contents" marker implies that certain SDE boxes are used for codestreams or codestream parts. The SDE indices may or may not signal the codestream parts. There may be no data other than the identifier, or the explicit range of packets. FIG. 7 shows the syntax for metadata for when a SDE box is present and an explicit range of packets contained in the SDE box is given. Note that for describing masks or binary images, the range of the layers and components will be 0 to 0. Also note that the range of precincts could be added to this syntax and all the other markers as well.

Referring to FIG. 7 of the following are used:

| | |
|---|---|
| $SDE_i$ | SDE box index value that contains the codestream data for the ranges of packets that follow. |
| $S_i$ | The number of ranges of packets that are described for $SDE_i$. |
| $T_i$ | Beginning and ending tile number. |
| $R_i$ | Beginning and ending resolution. |
| $L_i$ | Beginning and ending layer. |
| $C_i$ | Beginning and ending component. |

SDE Present, Explicit Contents, Tile-Parts

Figure 8:
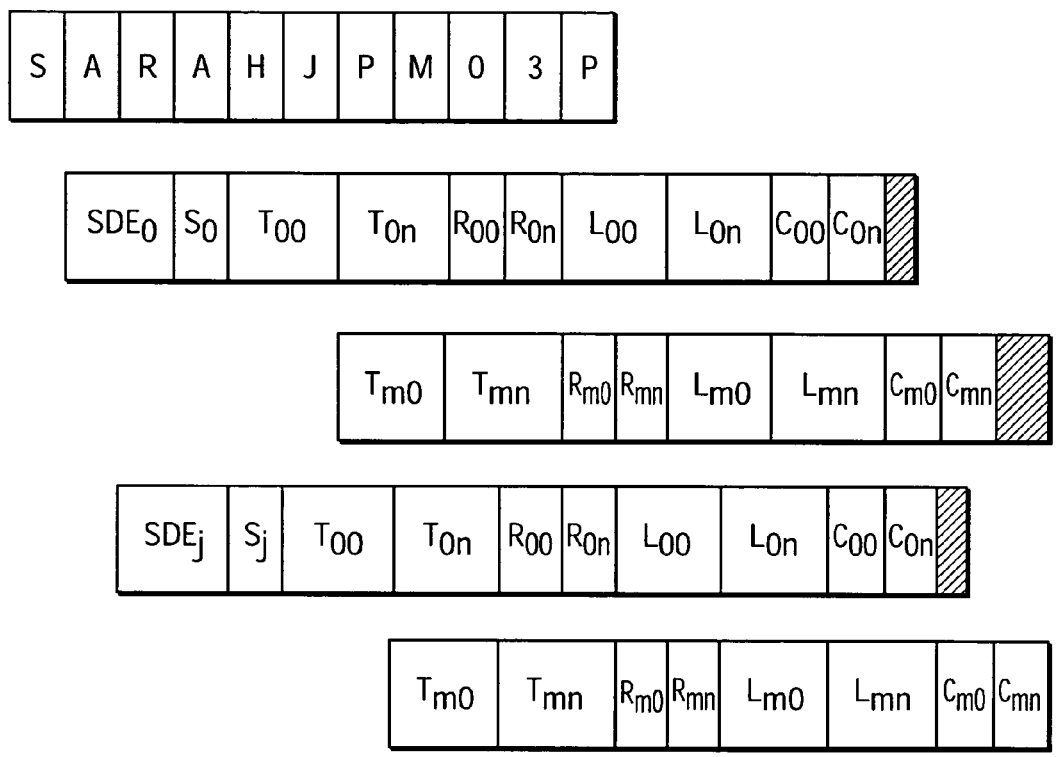
FIG. 8 illustrates an exemplary metadata for a representation of a SDE box with explicit contents and tile parts.

The presence of the "SDE present, explicit contents, tile-parts" marker implies that certain SDE boxes are used for JPEG 2000 codestream tile-parts. Each SDE contains one and only one tile-part. There may be no data other than the identifier, or the explicit range of packets in the tile-part. FIG. 8 shows the syntax for the metadata for an SDE box with an explicit range of packets in tile-parts. Note that for describing masks or binary images the range of the layers and components will always be 0 to 0. Also note that the range of precincts could be added to this syntax and all the other markers as well.

Referring to FIG. 8, the following are used:

| | |
|---|---|
| P | The type of progression given by Table 3. |
| $SDE_i$ | SDE box index value that contains the codestream data for the ranges of packets that follow. |
| $S_i$ | The number of ranges of packets that are described for $SDE_i$. |
| $T_i$ | Beginning and ending tile number. |
| $R_i$ | Beginning and ending resolution. |
| $L_i$ | Beginning and ending layer. |
| $C_i$ | Beginning and ending component. |

TABLE 3

| Progression order | |
|---|---|
| Values | Progression order |
| 0 | Layer-resolution level-component-position progression |
| 1 | Resolution level-layer-component-position progression |
| 2 | Resolution level-position-component-layer progression |
| 3 | Position-component-resolution level-layer progression |
| 4 | Component-position-resolution level-layer progression |
| | All other values reserved |
| 254 | Thumbnail, monitor, printer, lossless |
| 255 | Inconsistent for each tile |

Media Box Description

Figure 9:
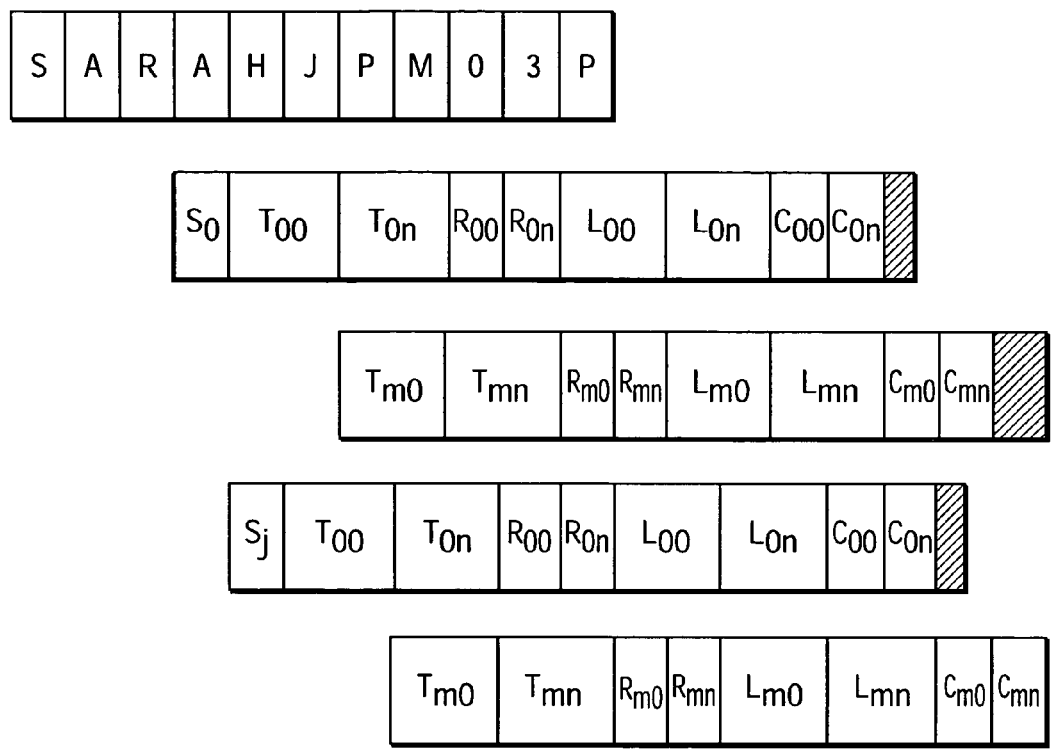
FIG. 9 illustrates an exemplary metadata for a representation of a media data box.

The "Media Box Description" marker can be used as the preamble to a Media Bpx that contains codestream elements. It relates the packets or mask codestreams (tile, resolution, layer, component) implies that certain SDE boxes are used for JPEG 2000 codestream tile-parts. Each SDE contains one and only one tile-part. There may be no data other than the identifier, or the explicit range of packets in the tile-part. FIG. 9 shows this syntax. Note that for describing masks or binary images the range of the layers and components will always be 0 to 0. Also note that the range of precincts could be added to this syntax and all the other markers as well.

Referring to FIG. 9, the following are used:

| | |
|---|---|
| P | The type of progression given by Table 3. |
| $S_i$ | The number of ranges of packets that are described for this media box. |
| $T_i$ | Beginning and ending tile number. |
| $R_i$ | Beginning and ending resolution. |
| $L_i$ | Beginning and ending layer. |
| $C_i$ | Beginning and ending component. |

Multiple Page Description

Figure 10:
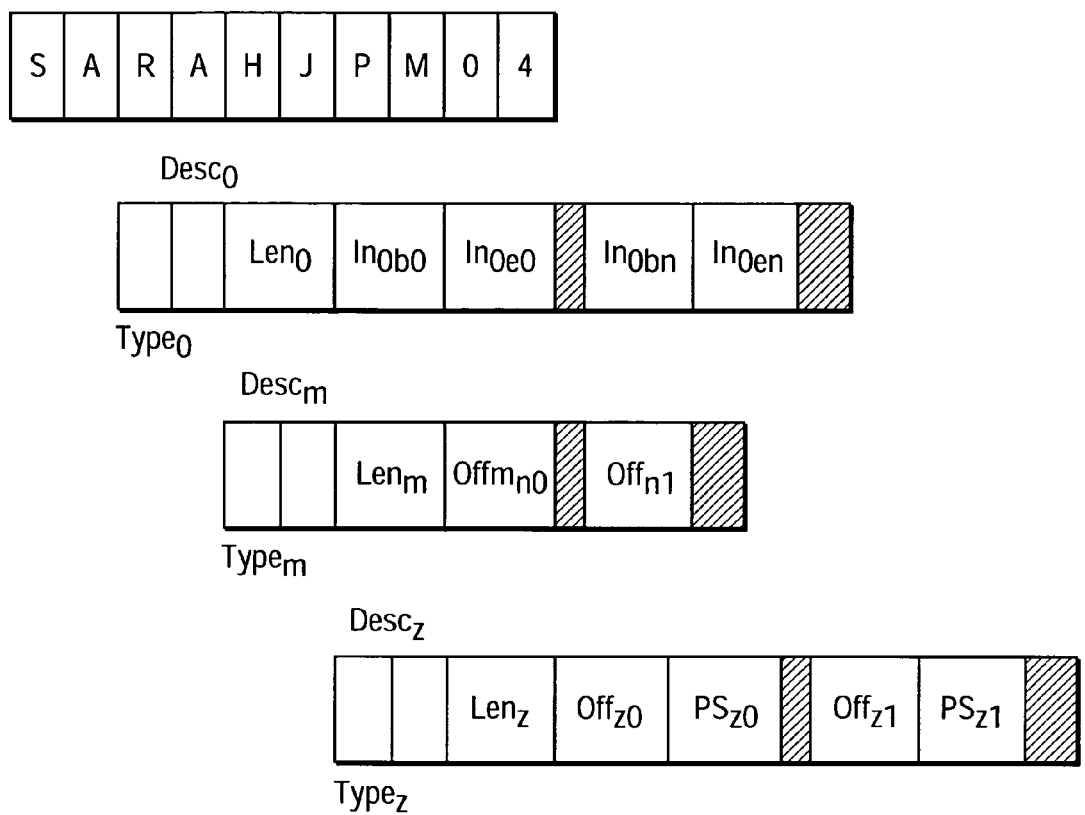
FIG. 10 illustrates an exemplary metadata for page and page collection descriptions.

The presence of the "Multiple Page Description" implies that some page images may have multiple Page boxes, or metadata Page boxes, associated with them. There may be no data other than the identifier, or the explicit range of pages can be given. FIG. 10 shows this syntax.

The techniques provided herein for multiple page descriptions provide alternative representations for pages present in a JPM file. For example, page 1 might be a full resolution image of the first page, while page 2 could be a thumbnail representation of the same page, and so on. The goal of metadata is two fold in this instance. First, the metadata describes pages and collections of pages that are in order, that is page 1, page 2, etc. Second, it describes how these pages are represented, e.g. full resolution, thumbnail, etc.

Ranges of pages, or page collections, are described. These two fields are followed by a "Len" field that describes the length in bytes of the description of this range. Thus, it is possible to have several range descriptions in one metadata box.

The syntax for this is shown in FIG. 9. Notice that the first run, noted by 0, describes the Page or Page Collection Boxes with a number, n, ranges of indexes each starting at b and ending at e. The next run, noted by m, describes Page or Page Collection Boxes with a series of offsets 0 through l. The last example shown, noted by z, shows Page Boxes described by offsets with the page size, PS, denoted. This is useful for responding to fixed or limited rate requests.

Referring to FIG. 10, the following list discloses the syntax used:

| | |
|---|---|
| $Type_i$ | For each range there is a "Type" value in Table 4 that describes how the pages are described by the JPM file. |
| $Desc_i$ | The "Desc" value in Table 5 that shows whether Page or Page Collection Boxes are referred to, shows whether or not these Page or Page Collection Boxes are obscured in a Free Boxes, and shows whether the description is an index to the Page or Page Collection Boxes or an absolute offset pointer to them. |
| $Len_i$ | Length of the given run. |
| $In_i$ | Index ranges for Page boxes or Page Collection boxes that are of the same type. |
| $Off_i$ | Offsets to the Page boxes or Page Collection boxes. (These may be hidden in metadata boxes. |
| $PS_i$ | Page size. |

TABLE 4

Type field for Page and Page Collection Box description metadata

| Type | Meaning |
|---|---|
| 0 | Full image |
| 1 | Thumbnail |
| 2 | Monitor resolution |
| 3 | ROI |
| 4 | Low bit-rate, full resolution |
| 5 | Low bit rate, monitor resolution |
| 6 | Representative icon page |
| 7 | other |
| 8-255 | reserved |

TABLE 5

Desc field for Page and Page Collection Box description metadata

| Description | Meaning |
|---|---|
| 0000 0xx0 | Page |
| 0000 0xx1 | Page Collection |
| 0000 0x0x | In JPM File Format |
| 0000 0x1x | In Free Box |
| 0000 00xx | Indexed |
| 0000 01xx | Offset |
| 0000 11x0 | Offset, followed by page size |
| | All other values reserved |

Storage for Metadata

The metadata is stored in metadata boxes. In one embodiment, from the JPM standard (Part 6), the box for this metadata is the Free box. To allow efficient parsing, it may be desirable to locate the metadata at the beginning of a JPM file. The metadata may be located immediately after the information that is required to be in the first part of a JPM file (to have the file still be considered a legal JPM file). In one embodiment, the metadata is in one of the assigned boxes, e.g., the Free box, and begins with a unique ASCII string such as, for example, SARAHJPM49. This is followed by the indexes, in binary, of each SDE box in the file. FIG. 5 shows an exemplary syntax. Referring to FIG. 5, the size of an SDE box index is two bytes. The information is included in a box, such as a Free box.

Many boxes may be used to indicate the type of data stored in the file. For example, from JPEG 2000 Annex Part 1, the Intellectual Property box, XML box, UUID box, and UUID Info box all allow user created data to be entered. Therefore, these may all be used for metadata that a decoder, configured and/or programed to recognize it and act based on it.

Other boxes from JPEG 2000, Part 6 may also be used. Also possible are the Media Data Box and the Shared Data Entry Box.

Alternatively, the data may be hidden in the entropy coded codestream. There is a rich body of literature in hiding data in entropy coded codestream and specifically in JPEG 2000 and JBIG. Any of these techniques may be used. Furthermore, it may be possible to have extra data at the end of a shared data box, perhaps the final one for the codestream, that is not decoded by an entropy coder. This data would also be acceptable for metadata.

Parser

The goal of the parsing is to convert one JPM file to another JPM file. As described above, an image may be divided into parts, may be stored in various boxes, and metadata may be used to indicate the contents of the boxes, the image may be described in various pages and metadata may be used to indicate where the pages are in a JPM file. Once JPM file has been set up, a parser may be used to obtain the data that is desired.

In one embodiment, a parser is a program that takes as its input a JPM file and the desired characteristics of the output JPM file (resolution, bit-rate, region of interest, component, object layering, text vs. image, page, etc.) and creates a new JPM file with only the needed data. This is done without decoding or decompressing the various codestreams in the JPM file.

Figure 12:
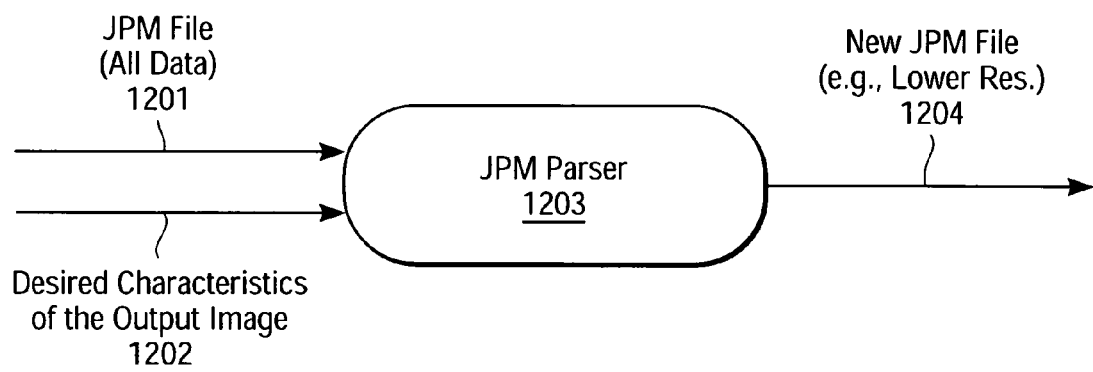
FIG. 12 illustrates parsing a JPM file.

The information used by a parser is from the available metadata, the JPM file boxes, and the codestream file formats and syntax. Referring to FIG. 12, a JPM file 1201 and an indication of the desired characteristics 1202 of an output image are input to JPM parser 1203, which generates a new JPM file 1204. JPM file 1204 may, for example, be a lower resolution version of JPM file 1201. Such a parser may be used to parse a JPM file with four pages to a JPM file with two pages.

In one embodiment, the parser is a generic parser that takes any JPM file (without the structure specified herein) and user desired output control specifying what the user wants. This input may be specified using a command line interface or application. Examples of user desired output control include specifying a resolution, bit-rate, area, component, pages, page collections (e.g., pages 1-4, 10 and 20-22). In response to these inputs, the parser parses the JPEG 2000 file or decodes all or part of the JPEG 2000 file and edits it (and subsequently re-encodes it). The parser may also edit boxes. The resulting output of the parser is a legal JPM codestream with the structure of shared data boxes and metadata described herein.

Parsing SDE Packed JPM Files

In another embodiment, the parser may be a SDE box parser that receives as an input a JPM file with the shared data box and metadata structure described herein along with user desired output control. Examples of user desired output control include specifying a resolution, bit-rate, area, component, pages, page collections (e.g., pages 14, 10 and 20-22), layout objects, an indication of whether objects are present or not, scale, location, and order. The operations performed by the parser may include reading metadata, editing one or more boxes, and skipping or removing one or more shared data boxes or other boxes based on the specified operation. The output is a JPM file with or without the shared data box and metadata structure described herein.

Parsing Page Descriptions

Note that the shared data box parser and the generic parser may be the same parser. This is also the case for the page description parser described in more detail below. The advantage of the SDE boxes with metadata parsing is that it is much quicker and requires no understanding of the JPEG 2000 codestream.

Consolidator

Figure 13A:
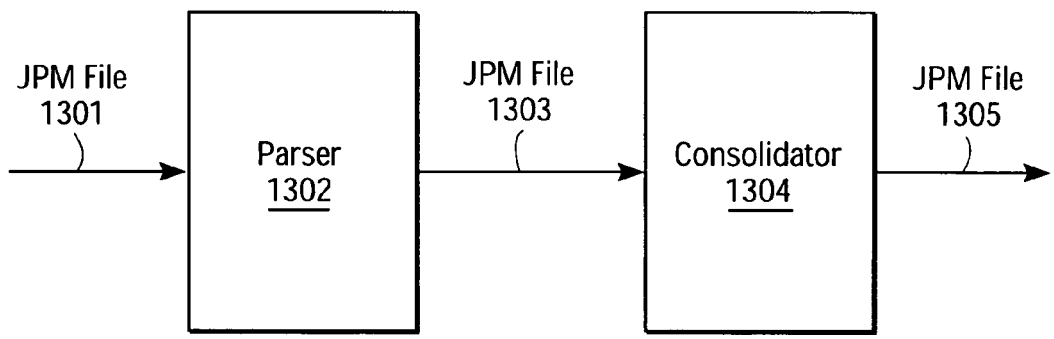
FIG. 13A illustrates a flow diagram of the use of a consolidator after parsing a JPM file.
Figure 13B:
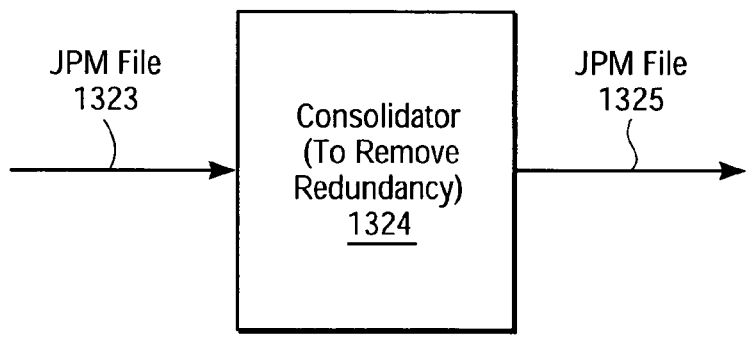
FIG. 13B illustrates the use of a consolidator to reduce redundancy in a JPM file.

In one embodiment, after parsing, a smaller or minimum sized JPM file may be created. FIG. 13A illustrates a JPM file 1601 undergoes parsing by parser 1602 to create JPM file 1303. The parsing may be performed to create a JPM file for a specific purpose (e.g., resolution, region of interest, etc.). The consolidator 1304 receives JPM file 1303 and removes data in JPM file 1303 that is no longer needed for the specific purpose for which parser 1302 parsed JPM file 1301. Note that a consolidator differs from a parser in that a consolidator generates a file that will be decoded into the same image that the JPM file would have produced had the pre-consolidated version of the JPM file been decoded. A parser, on the other hand, generates a JPM file that, when decoded, produces a different image than would have been produced had the pre-parsed version of the JPM file been decoded. A consolidator can work on a file, without parsing to remove the redundancy, such as shown in FIG. 13B.

Segmentation JPM File

Most JPM implementations use segmentation to achieve better compression. However, there are other reasons to use segmentation such as, for example, enhancement and optical character recognition (OCR). This segmentation information may be captured and saved in a JPM file with the original image from which it is generated. Also, attributes of the image for cataloging could be captured in a JPM object. This information is referred to herein as sideband information and it is stored in one or more JPM objects. These objects are not intended to be displayed in a image generated from the JPM file by a JPM decoder. Instead these objects are for signaling for another purpose other than for use in generating an image from the JPM file.

These objects may be stored as extra pages, in codestream boxes, in SDE boxes, in MDAT boxes, or as codestreams that are part of layers but have no effect on an image.

Being able to interchange this data in an open standard is convenient for some applications. In this manner, a JPM file may be used to transport the sideband information.

Figure 22:
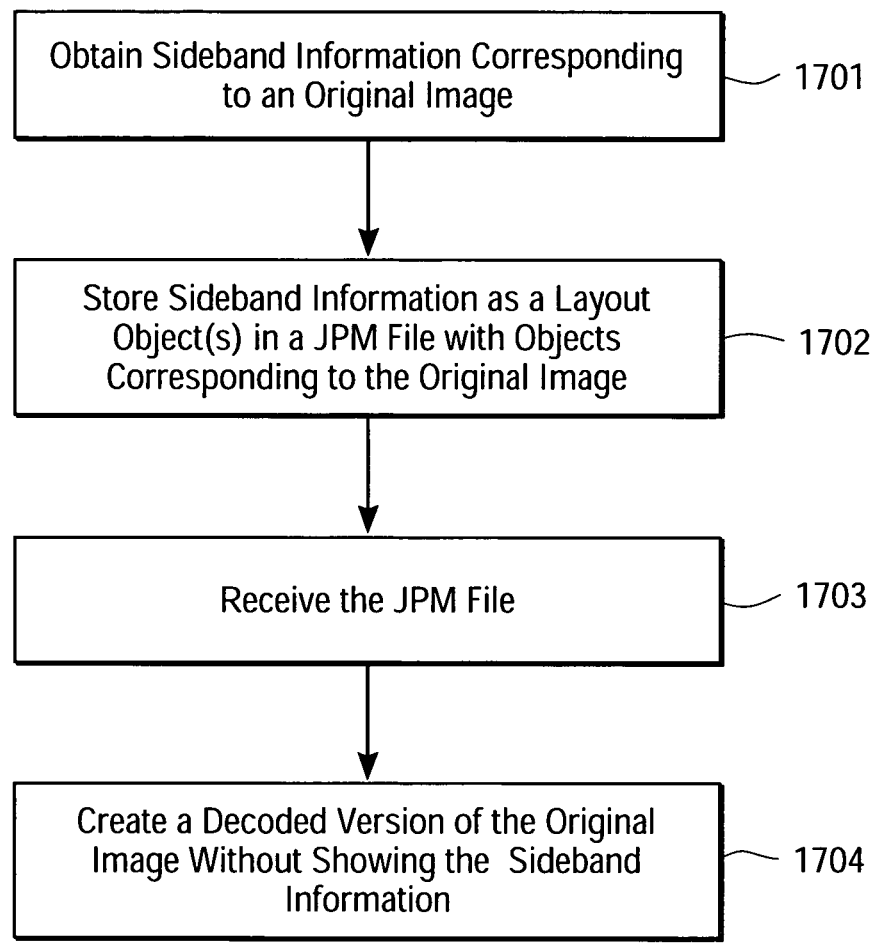
FIG. 22 is a flow diagram of one embodiment of a process for using a JPM file with sideband information.

FIG. 22 is a flow diagram of one embodiment of a process for using a JPM file with sideband information. The process is performed by processing logic that may comprise hardware (e.g., circuitry, dedicated logic, etc.), software (such as is run on a general purpose computer system or a dedicated machine), or a combination of both.

Referring to FIG. 22, the process begins with processing logic receiving sideband image information corresponding to an original image (processing block 2201). As mentioned above, the sideband image information is without visual meaning with respect to the original image and is not intended for display. That is, the sideband image information is for a purpose other than use in display of, or generation of, a decoded image. In one embodiment, the purpose is for another image processing algorithm.

In one embodiment, the sideband information comprises one or more segmented versions of an image generated as a result of performing segmentation on the original image. These segmented versions of an image may be for another image processing algorithm. In one embodiment, the image processing algorithm is a sharpening and smoothing algorithm to sharpen text and smooth halftone regions using an adaptive enhancement filter. In on embodiment, the sideband information is used to improve the printout for a particular family of printers or copiers. In such a case, in one embodiment, text may be extracted where the text has been identified through the use of a mask. The text may then undergo, for example, sharpening. Thus, different operations may be performed based on spatial location.

Figure 23:
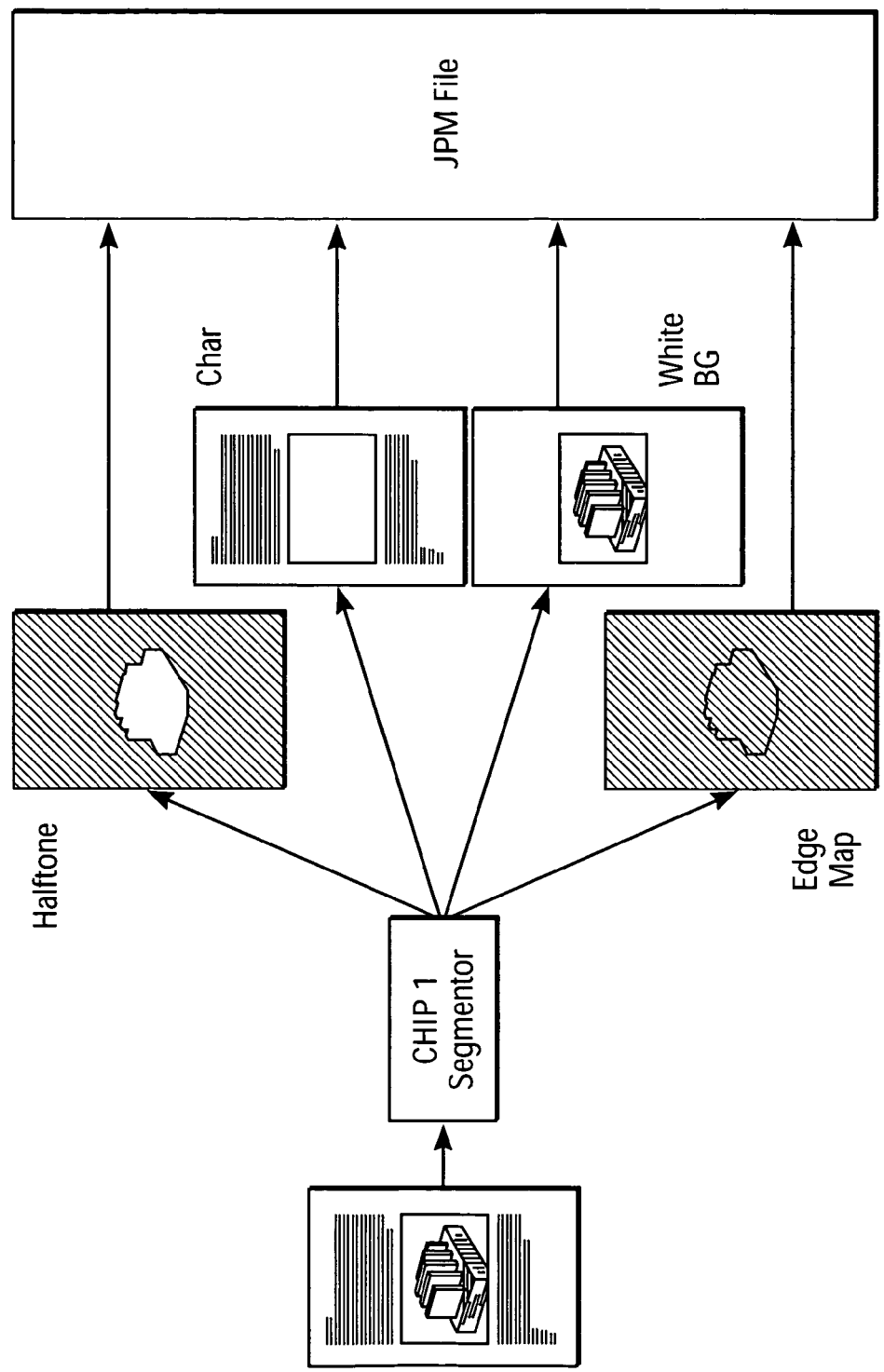
FIG. 23 is an example of the use of a segmentor to produce segmented images and store those in a JPM file.

FIG. 23 is an example of the use of a segmented to produce segmented images. Referring to FIG. 23, four different segmented versions of the image, namely, a halftone image, a characters image, a white background image and an edge map. There are all generated from a segmentor and are stored in a JPM file. The segmentor may be one or more segmentor integrated circuit chips and/or software. The segmentor may be part of a system or machine, such as a copier or multi-function machine.

Other examples of sideband information includes document analysis information. The document analysis information may be OCR information, such as, for example, box, line, text, and flow information. The sideband information may include attributes to enable retrieval of the original image. The sideband information may include an alpha channel. The sideband information may include edge information to assist a vision system or some other image analysis (e.g., medical image analysis). The sideband information may include other image processing pixel mapped information used for image processing or other two-dimensional information.

Next, processing logic stores the one or more layout objects corresponding to the original image and the sideband information in a JPM file (processing block 2202). The formatting of an original image into the one or more layout objects that may be stored in a JPM file is well-known in the art. Each of the layout objects may include an image and/or mask that may be in compressed format as described above. The sideband information is stored as one or more layout objects. The sideband information may be stored in the JPM in boxes with or without metadata and/or as part of a page collection.

At this point, the JPM file may then be stored, transported, and/or further processed. Thus, by storing the sideband information in the JPM file, the JPM file may be used as a transport for the sideband information.

At some point in time, processing logic receives the JPM (processing block 2203). The processing logic may be part of a dumb JPM decoder or a smart JPM decoder.

After receiving the JPM file, processing logic in a dumb decoder creates the decoded image by accessing information in the JPM file corresponding to the layout objects of the original image and decodes compressed portions of the information (processing block 2204). The sideband image information is not intended to be displayed with the decoded image and is absent from display of the decoded image. In one embodiment, the information of the one or more layout objects corresponding to the original image in the decoded image occlude the sideband information.

When creating the decoded version of the original image, the sideband information layout object(s) may be hidden from a dumb decoder. In one embodiment, the sideband information layout object(s) is hidden by one or more layout objects associated with the original image occluding the sideband information layout object. These may be the last set of layout objects of the image. In another embodiment, the layout object(s) corresponding to the sideband information includes a mask stored in the JPM file that completely occludes the sideband information layout object during display of the decoded image. In yet another embodiment, the layout object(s) corresponding to the sideband information include scale information that causes a decoder to scale a mask and an image of the layout object(s) to a size (e.g., a single pixel, etc.) in the decoded image that renders it unnoticeable to human visual system. In still yet another embodiment, the sideband information layout object(s) corresponding to the sideband information include location information that causes a decoder to position a mask and an image of the sideband information layout object(s) to a location off a displayed representation of the decoded image. In even still another embodiment, the layout object(s) corresponding to the sideband information include parameter information that causes a decoder to crop a mask and an image of the sideband information layout object(s) to nothing. In yet another embodiment, the codestream of the sideband information is simply not referenced. However, a parser or consolidator program might remove this codestream. In another embodiment, extra information comes first as mask codestreams and mask in the base color of the page.

In one embodiment, after receiving the JPM file, processing logic in a smart decoder accesses the sideband information from the JPM file to perform an image processing is simply not referenced. However, a parse or consolidator program might remove this codestream operation on image data corresponding to the original image in the JPM file. The access may be obtained through parsing. Thus, a smart decoder is able to take advantage of the sideband information.

A marker may be used for segmentation. In one embodiment, such a marker explicitly calls out page, object, and type (e.g., on page x, object y is type z), where type may indicate, for example, edge masks, text vs. image, smooth vs. sharp, etc. An exemplary marker may be in the same form as the marker shown in FIG. 16A that is discussed in greater detail below.

Layout Objects as Image Layers

Figure 17A:
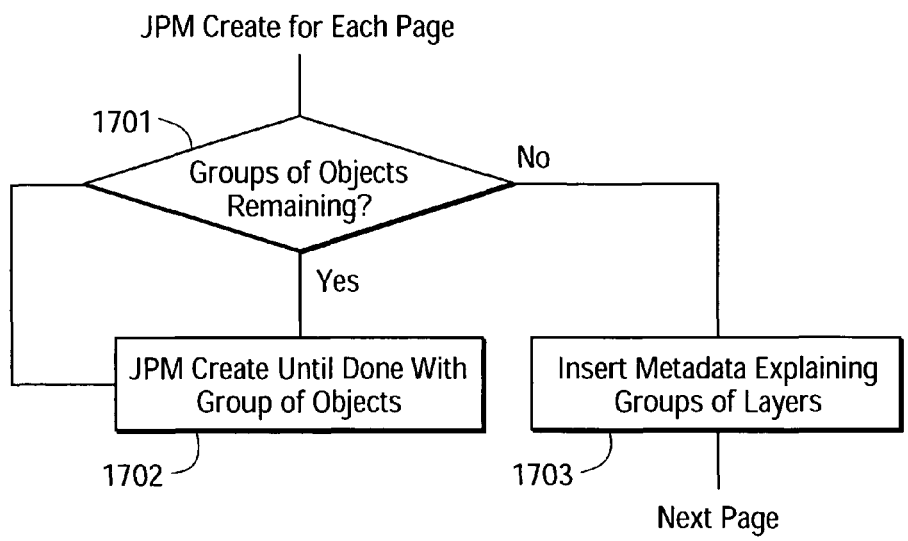
FIG. 17A is a flow diagram of a process for JPM encoding with metadata.

Many image processing systems, such as Adobe Photoshop and Illustrator, from Adobe Systems Incorporated of San Jose, Calif., use the concept of image layers. Objects in JPM can be used for the same type of layering. FIG. 17A illustrates one embodiment of a process for layering performed by processing logic of an encoder or JPM creator. The processing logic may comprise hardware (e.g., circuitry, dedicated logic, etc.), software (such as is now on a general purpose computer system or a dedicated machine), or a combination of both. This process is performed for each page.

Referring to FIG. 17A, process begins by processing logic testing whether there are groups of objects remaining (process block 1701). If so, processing logic performs a JPM creation function until done with the group of objects (processing block 1702), and processing transitions back to processing block 1701. If not, processing logic inserts metadata explaining the group of layers (processing block 1703), and transitions to performing the layering on the next page of objects.

Figure 17B:
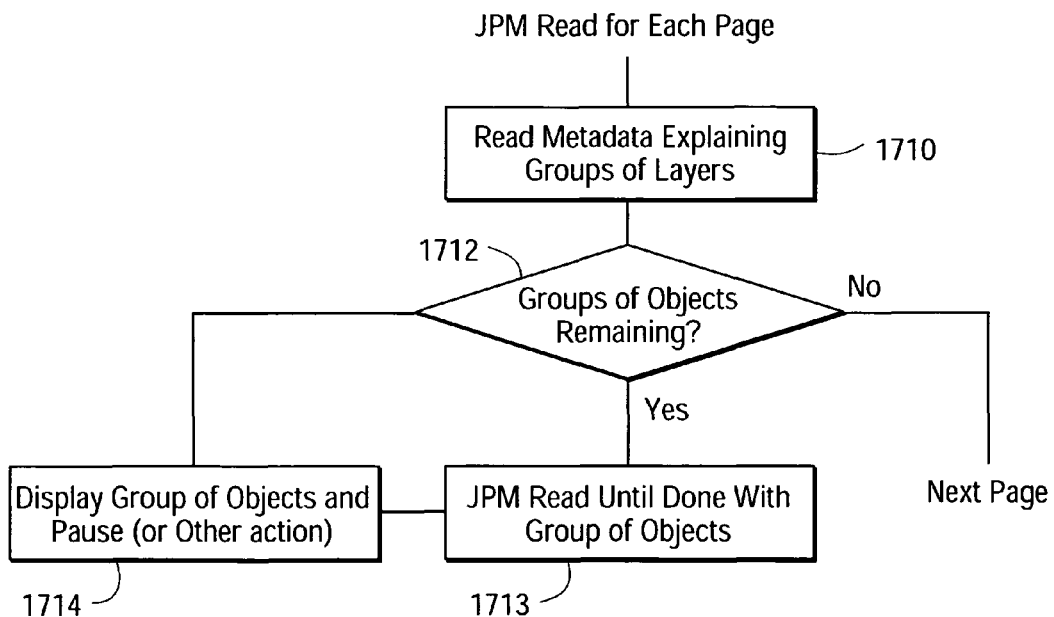
FIG. 17B is a flow diagram of a process for JPM decoding with metadata.

FIG. 17B illustrates one embodiment of the layering process performed during decoding. The process is performed by processing logic which may comprise hardware (e.g., circuitry, dedicated logic, etc.), software (such as is now on a general purpose computer system or a dedicated machine), or a combination of both.

Referring to FIG. 17B, after performing a JPM read for each page, processing logic reads the metadata explaining groups of layers (processing block 1710). Processing logic tests whether there are groups of objects remaining (processing block 1712). If not, processing logic transitions to the next page. If so, processing logic performs a JPM read operation until done with the groups of objects (processing logic 1713) and processing logic displays groups of objects and pauses (or performs other action) (processing block 1714). Processing logic then transitions back to processing block 1712.

Signaling for Layering Decoding Layer Description

Figure 16A:
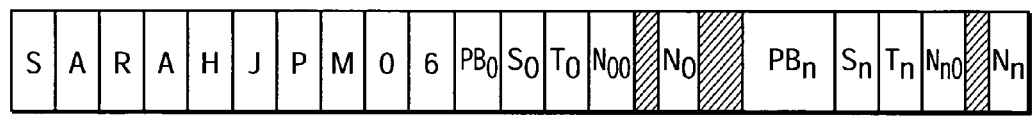
FIG. 16A illustrates exemplary metadata for layering description.

FIG. 16A illustrates metadata for use in layering. The presence of marker implies that groups of object layers for some pages make sense to be decoded, displayed, and have some other action. Referring to FIG. 16A, the following are used:

$PB_i$ Page box index value that the range of layout objects of interest are contained.

$S_i$ The number of groups of layout objects that are in this page.

$TY_i$ Type of action the decoder may take at the completion of a group. See Table 6

$N_{ij}$ Number of layout objects belonging to jth group.

TABLE 6

Type of actions after decoding a group of layout objects

| Description | Meaning |
| --- | --- |
| 0 | Display and pause till next application input |
| 1 | Progressive creation of thumbnail |
| 2 | Progressive creation of thumbnail, monitor |
| 3 | Progressive creation of thumbnail, monitor, printer |
| 4 | Progressive creation of thumbnail, monitor, printer, and lossless |
| 5 | Display in separate window |
| 6 | Data not intended for display |
|  | All other values reserved |

Examples of applications that could exploit this layering are presented herein.

Object layering may be used for sequential image display. The objects are presented in a certain order. A specially prepared JPM file, and a smart decoder that was aware of the preparation, could present several images in one page description by "pausing" and rendering after only a subset of layout objects are considered. For example, in one embodiment, a JPM file includes two sets of objects. The first set of layout objects creates a first image (e.g., thumbnail), while the second set of layout objects creates a second image (e.g., a full size page) which occludes the first image completely. A generic decoder decodes both the first and second sets of layout objects but only presents the second image. In contrast, a smart decoder that is aware of the organization of the JPM file can be stepped through the first and second sets of layout objects.

Figure 18:
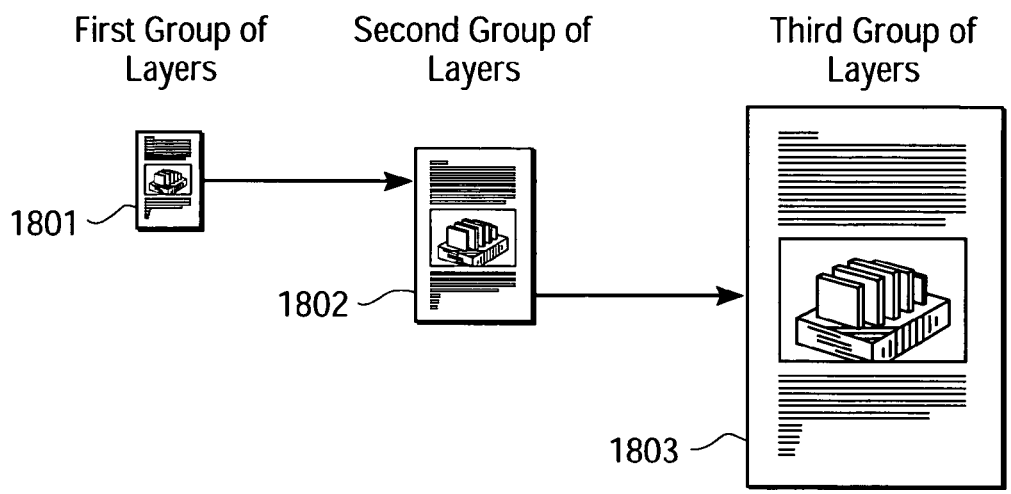
FIG. 18 is an example of the use of a sequential display of images from the same JPM file.

FIG. 18 illustrates sequential image display. Referring to FIG. 18, a JPM file includes three sets of objects to create three different images. The first set of objects creates image 1801. The second set of objects creates image 1802, which would completely occlude image 1801 after being displayed. The third set of objects creates image 1803, which would completely occlude image 1802 (and image 1801) after being displayed.

This concept of using object layering for sequential image display may be extended to achieve limited animation. In such a case, a smart decoder may be able to present individual images, each of which is generated from a different set of layout objects in the same JPM file, sequential over a period of time. All the layout objects in the sets do not have to be different. In one embodiment, minor changes between the layout objects may be compressed. The segmented image display is done by signaling the decoder. A smart decoder, aware of the goal of displaying the images sequentially, would create animation (e.g., a slide show). This could also be done with multiple pages.

Figure 19:
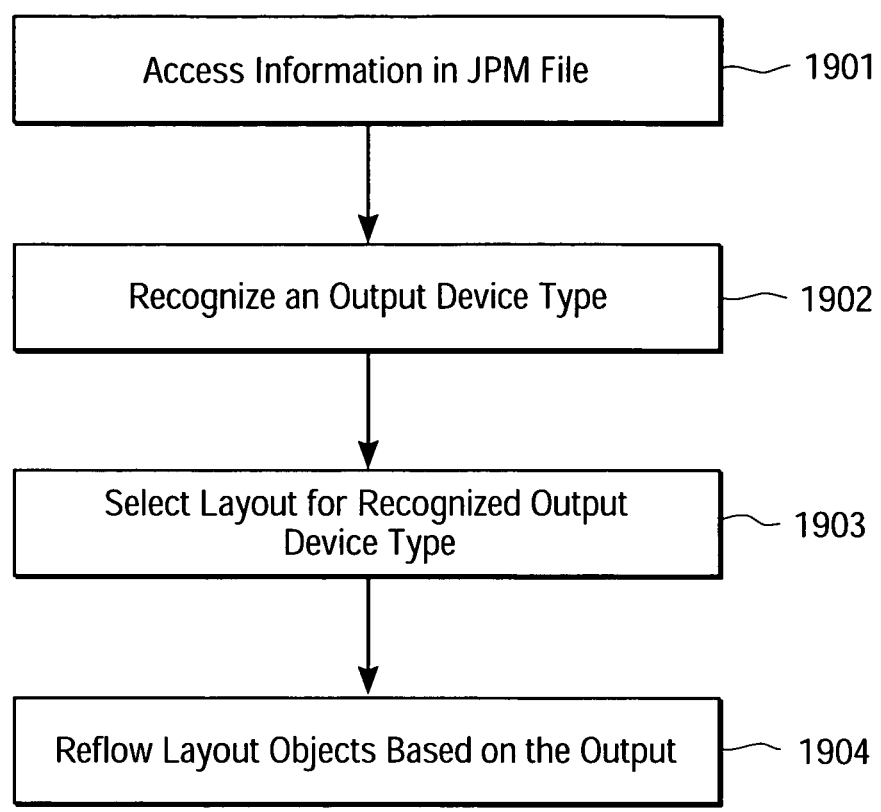
FIG. 19 is flow diagram of one embodiment of a process for reflow text using object as layers in a JPM file.

Object layering may be used for text reflow. If the objects correspond to words (or even sentences and paragraphs) and the reading order is known (such as from document analysis or optical character recognition (OCR) or layout analysis software, then these objects could be "reflowed" according to a display device (e.g., personal digital assistant (PDA)) or application to present a more useful page. When reflowing objects according to the display device, the output device is initially recognized and a layout for that particular display device is selected. This process is shown in an exemplary flow chart in FIG. 19. For example, a text page originally intended for an 8.5"×11" print could be reflowed or redrawn with fewer words per line for a PDA display device. In another example, single column images could be reflowed to double column if the user preferred. In one embodiment, to perform reflow, the decoder or parser recalculates the location and extent of objects to reposition the layout objects. The decoder may examine the layout, determine the space it has and then start putting objects in the layout until its full. Extra objects could be discarded or put on another page or another display.

Object layering may be used for spatial information. For example, object layering may be used for geography such as maps. In this case, maps may be rendered with different objects for roads, lakes, mountains, forests, parks, airports, etc. Thus, it is possible for a smart decoder to display a map without roads for example or the color of certain objects can be easily changed. Other spatial information may include demographic information, satellite information, fluid dynamics, medical imaging (MRI), etc. Signalingfor Map Element—Map Element Description This marker is similar to the layer description marker with three differences. First, the identifier is different. Second, there are a number of ASCII string labels in an XML format (<label>string</label>) at the end of the marker that informs the application of the purpose of each group of objects. Third, all of the pages listed have exactly the same number of groups of objects. (Multiple markers of this type can be used to describe different types of pages.) Note that although this is called "map elements," many types of data could be denoted this way, including segmentation "maps."

Figure 16B:
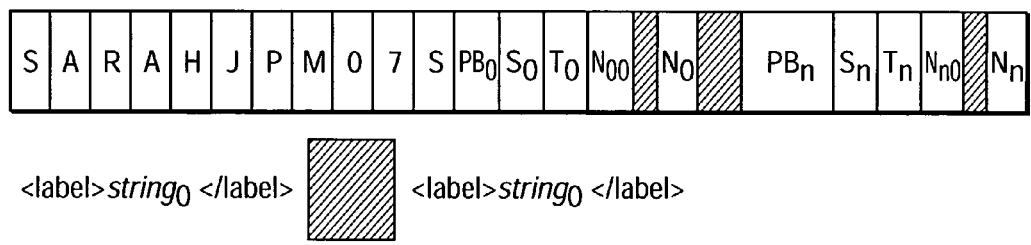
FIG. 16B illustrates exemplary metadata for map elements description.

FIG. 16B illustrates an exemplary metadata for maps. Referring to FIG. 16B, the following are used:

| | |
|---|---|
| S | The number of groups of layout objects that are all the pages. |
| $PB_i$ | Page box index value that the range of layout objects of interest are contained. |
| $TY_i$ | Type of action the decoder may take at the completion of a group. See Table 7 |
| $N_{ij}$ | Number of layout objects belonging to jth group. |

TABLE 7

Type of actions after decoding a group of layout objects

| Description | Meaning |
|---|---|
| 0 | Display and pause till next application input |
| 1 | Progressive creation of thumbnail |
| 2 | Progressive creation of thumbnail, monitor |
| 3 | Progressive creation of thumbnail, monitor, printer |
| 4 | Progressive creation of thumbnail, monitor, printer, and lossless |
| 5 | Display in separate window |
| 6 | Data not intended for display |
| | All other values reserved |

Object layering may be used for image editing undo. In one embodiment, the ordered groups of layout objects are sequential edits performed on the image. The first group of layout objects is the original image. The subsequent layout objects are the appropriate images that occlude the original image as a function of an image processing algorithm. This allows for an image editing "undo" function.

Figure 20:
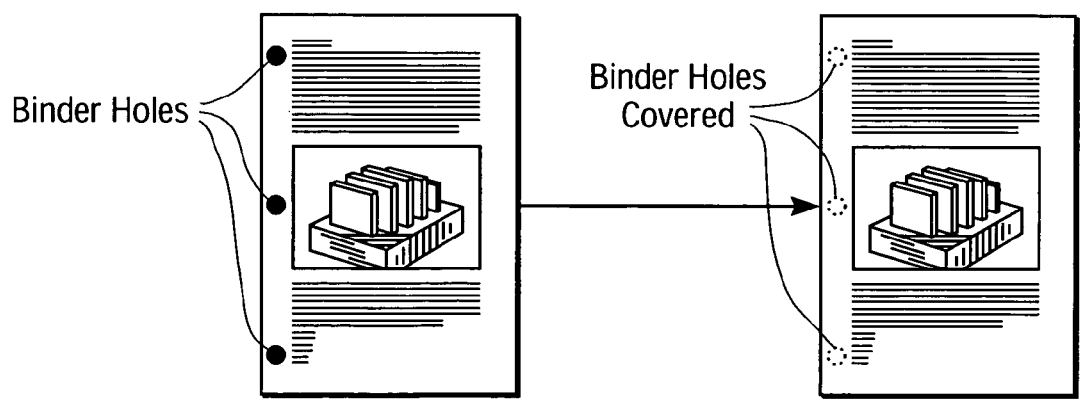
FIG. 20 illustrates layering where the first group alone would be an example of image editing undo.

FIG. 20 shows image editing undo. Referring to FIG. 20, a first group of layout objects is an original image that has a set of binder holes. One or more additional groups of layout objects are an image or a set of images that occlude the binder holes in the original image. In one embodiment, the edits are objects such as the binder holes that occlude less than the full image. In an alternative embodiment, the edits represent an edited version of the same entire image.

Figure 21:
FIGS. 21A-F is an example of sequential access.
Figure 21:
Figure 21:
Figure 21:
Figure 21:
Figure 21:

Object layering may also be used for different levels of access. For example, a form may be encoded in a JPM image. The data filling out the form is segmented and stored in a sequence of layout objects. For security, these objects are encrypted or in a separate encrypted JPM file. Access to these objects is limited according to the application. For example, a medical form may have contact information that is available to hospital personnel such as the billing department. However, the diagnosis may be contained in encrypted objects that may only be viewed by the doctor and the insurance adjustor. FIGS. 21A-F shows a segmented access for medical form JPM file. Referring to FIG. 21A, a medical form is shown with a portion blanked out. FIG. 21B shows the same medical form with copies of the holes edited out by way of another layer. FIGS. 21C-F show the medical form filled in with more information as additional layers are added.

In one embodiment, a JPM file (or portion thereof) is encrypted and produces a part of an image (e.g., a form) when decrypted and also includes one or more pointers to one or more non-encrypted files, respectively. Therefore, by decrypting the encrypted JPM file, the encrypted portion of the image may be obtained along with the non-encrypted portion of the image (using any available pointers to non-encrypted JPM files).

In one embodiment, objects having spatially separated layers may also be useful to provide different levels of access. For example, a form such as described above may be represented as multiple objects where each of the objects represents a different portion of the form.

In one embodiment, layering may be used to allow for parallel processing of the layers. In this case, the layers are separated spatially, and two or more of the layers may be processed in parallel with each other. Such layering of objects may also be useful for parallel encoding, decoding, and access. The processing may be by separate processors, systems, threads, etc.

In one embodiment, the objects are layered progressively by content. In this case, the most important objects are processed (e.g., decoded) first. In the case of a form, in one embodiment, these objects may include the signature, the title of the form, and the date.

An Example

An SDE Parsing Example

For this example, a JPM file has been created with one page image with six layout objects tiled two wide by three high. There is one JPEG 2000 codestream that covers the entire page. The tiles of the JPEG 2000 codestream are used for six image objects. There are 18 mask object codestream (6 tiles×3 resolutions).

There is no requirement when a object mask is downsampled and compressed at multiple resolutions that it be split into the same number of layout objects at each resolution. There is some advantage to splitting it into the same tiles as a JPEG 2000 image used in the image part, but there is an advantage to using fewer layout objects at low resolution. Each layout object has some amount of overhead, and the overhead for 6 "tiles" on a page may not be much at high resolution, but at ⅛th resolution the overhead is much higher.

Thus at ⅛th resolution it may make sense to use only one layout object for the entire object mask.

The full size background contone image is compressed with a JPEG 2000 encoder once with settings of six tiles and three resolution levels. Thus, there is the possibility of accessing only the image data needed to correspond to any of the 18 mask codestreams.

For example, a contone image of the JPEG 2000 test image cmpndl of 768×512 RGB color image is compressed with a JPEG 2000 encoder with tile_number 6, resolution_number=3, layer_number=2, component_number=3, precinct_number=1.

TABLE 8

Example 1: Resolution progression packet size and index for the SDE Box

| | Packet size in bytes | | | |
|---|---|---|---|---|
| | Quarter size | Half size | Full size | SDE index |
| T2R0L0C0 | 2437 | 2437 | 2437 | 36 |
| C1 | 1723 | 1723 | 1723 | 37 |
| C2 | 1575 | 1575 | 1575 | 38 |
| T2R0L1C0 | 464 | 464 | 464 | 39 |
| C1 | 433 | 433 | 433 | 40 |
| C2 | 424 | 424 | 424 | 41 |
| T2R1L0C0 | — | 5510 | 5510 | 42 |
| C1 | — | 4341 | 4341 | 43 |
| C2 | — | 3703 | 3703 | 44 |
| T2R1L1C0 | — | 1409 | 1409 | 45 |
| C1 | — | 1440 | 1440 | 46 |
| C2 | — | 1483 | 1483 | 47 |
| T2R2L0C0 | — | — | 16,639 | 48 |
| C1 | — | — | 13,978 | 49 |
| C2 | — | — | 11,617 | 50 |
| T2R2L1C0 | — | — | 5892 | 51 |
| C1 | — | — | 5819 | 52 |
| C2 | — | — | 5862 | 53 |

Assuming only one precinct per tile, T2R0L0C0 indicates Tile 2, Resolution 0, Layer 0, Component 0. The "packet=2437" means the packet size is 2437 bytes. For resolution progression, the main and tile headers for the full size, half size and quarter size images are made available. The main and tile headers for a 1-layer image and 1-component image are also made available.

Because SDE boxes are used to store all pieces of codestream, the same data may be reused as many times as needed without redundantly repeating the data. In the actual place where the data is needed to be present, a pointer is used to refer to the data stored in a particular SDE box specified with a unique ID. For region progressive feature by tiling, Tile 2 out of 6 tiles is selected. The following data is for Tile 2 only.

For resolution progression in Table 8, three resolutions for Tile 2 are demonstrated. The quarter size Tile 2 includes Resolution 0 data in the first column. The half size Tile 2 contains Resolution 0 and Resolution 1 data as shown in the second For quality progression in Table 9, two layers of quality in Tile 2 are shown. In this example, the Layer 0 quality codestream contains data in the first column. The higher quality codestream includes more data as shown in the second column.

TABLE 9

Example 2: Quality progression packet size and index for the SDE Box

| | Packet size in bytes | | |
|---|---|---|---|
| | Lossy | Lossless | SDE Box index |
| T2R0L0C0 | 2437 | 2437 | 36 |
| C1 | 1723 | 1723 | 37 |
| C2 | 1575 | 1575 | 38 |
| T2R1L0C0 | 5510 | 5510 | 42 |
| C1 | 4341 | 4341 | 43 |
| C2 | 3703 | 3703 | 44 |
| T2R2L0C0 | 16,639 | 16,639 | 48 |
| C1 | 13,978 | 13,978 | 49 |
| C2 | 11,617 | 11,617 | 50 |
| T2R0L1C0 | — | 464 | 39 |
| C1 | — | 433 | 40 |
| C2 | — | 424 | 41 |
| T2R1L1C0 | — | 1409 | 45 |
| C1 | — | 1440 | 46 |
| C2 | — | 1483 | 47 |
| T2R2L1C0 | — | 5892 | 51 |
| C1 | — | 5819 | 52 |
| C2 | — | 5862 | 53 |

For progression by component in Table 10, a grayscale version of Tile 2 is shown. This codestream includes data for Component 0 only.

TABLE 10

Example 3: Component 0 Packet Size and Index for the SDE Box

| | Packet size in bytes | | |
|---|---|---|---|
| | Lossy | Lossless | SDE Box index |
| T2R0L0C0 | 2437 | 2437 | 36 |
| T2R1L0C0 | 5510 | 5510 | 42 |
| T2R2L0C0 | 16,639 | 16,639 | 48 |
| T2R0L1C0 | — | 464 | 39 |
| T2R1L1C0 | — | 1409 | 45 |
| T2R2L1C0 | — | 5892 | 51 |

Figure 11:
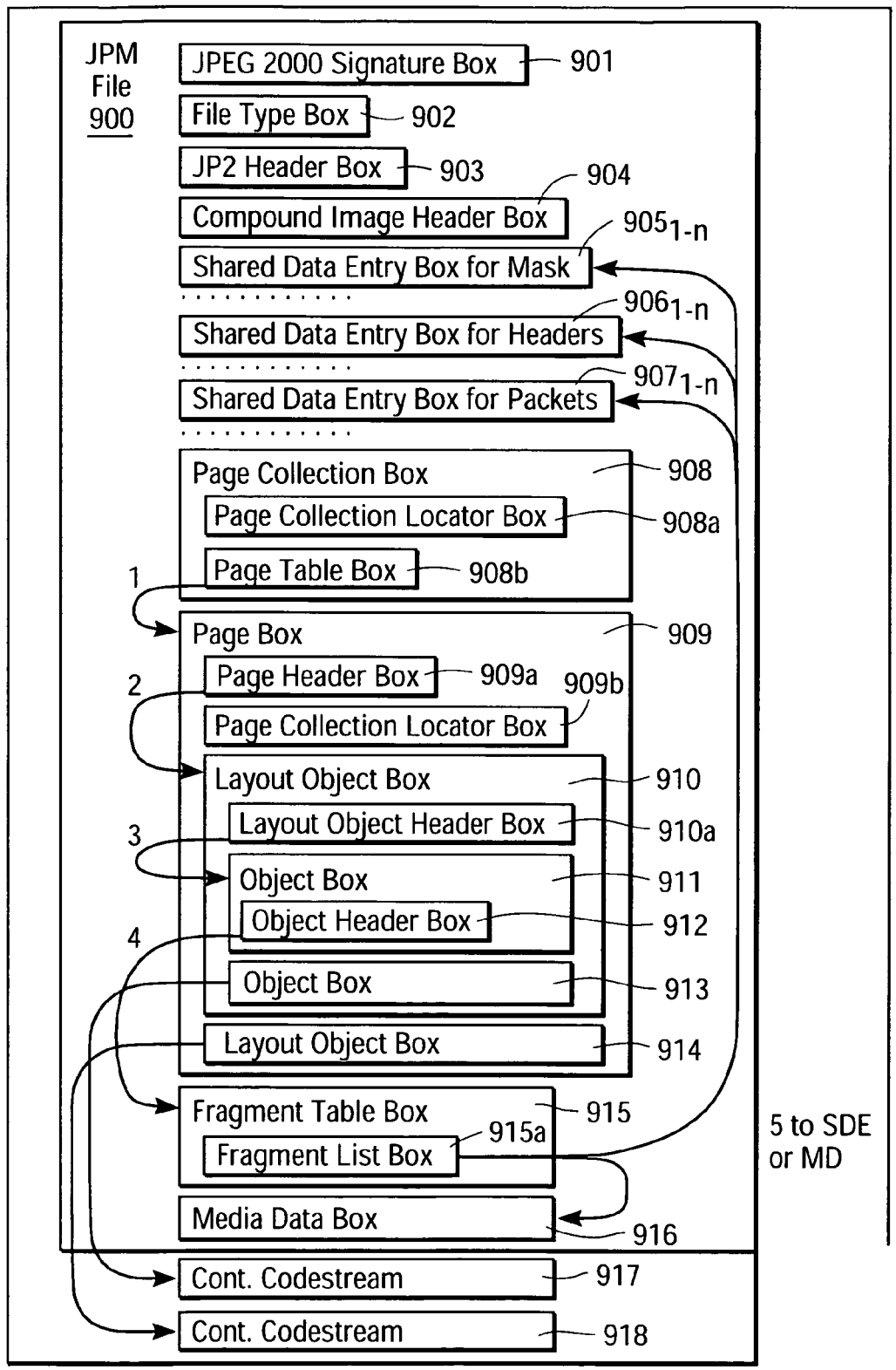
FIG. 11 illustrates an example of pointers in a JPM file.

FIG. 11 is an example of a JPM file box structure using pointers to describe a page. Referring to FIG. 11, JPM file 900 includes JPEG 2000 Signature box 901, File Type box 902, JP2 Header box 903, Compound Image Header box 904, one or more Shared Data Entry boxes for object mask $905_{1-n}$, one or more Shared Data Entry boxes for headers $906_{1-n}$, one or more Shared Data Entry boxes for packets $907_{1-n}$, a Page Collection box 908 that contains a Page Collection Locator Box 908A and a Page Table box 908B, a Page Box 909 that includes a Page Header box 909A, a Page Collection Locator box 909B, and one or more Layout Object boxes, such as Layout Object box 910 that contains Layout Object Header box 910A and one or more Object boxes such as Object box 911, which may contain Object Header box 912, and Object box 913, and Layout object box 914. JPM file 900 also includes a Fragment Table box 915, which has a Fragment List box 915A, a Media Data box 916, a Contiguous Codestream boxes 917 and 918.

Page boxes, such as Page box 909, points to the Layout Object boxes, such as Layout Object box 910. Layout Object boxes, such as Layout Object box 910, points into the Fragment Table box, such as Fragment Table box 915. The Fragment Table box, such as Fragment Table box 915, points to either the SDE Boxes or the Media Data Boxes. In FIG. 11, Fragment List box 915A or Fragment Table box 915 points to Media Data box 916 and one or more SDE boxes for the object mask, headers and packets. Object box 913 points to Contiguous Codestream box 917. Layout Object box 914 points to Contiguous Codestream box 918.

A contiguous codestream box holds a codestream. A SDR box points to an SDE box.

Figure 14A:
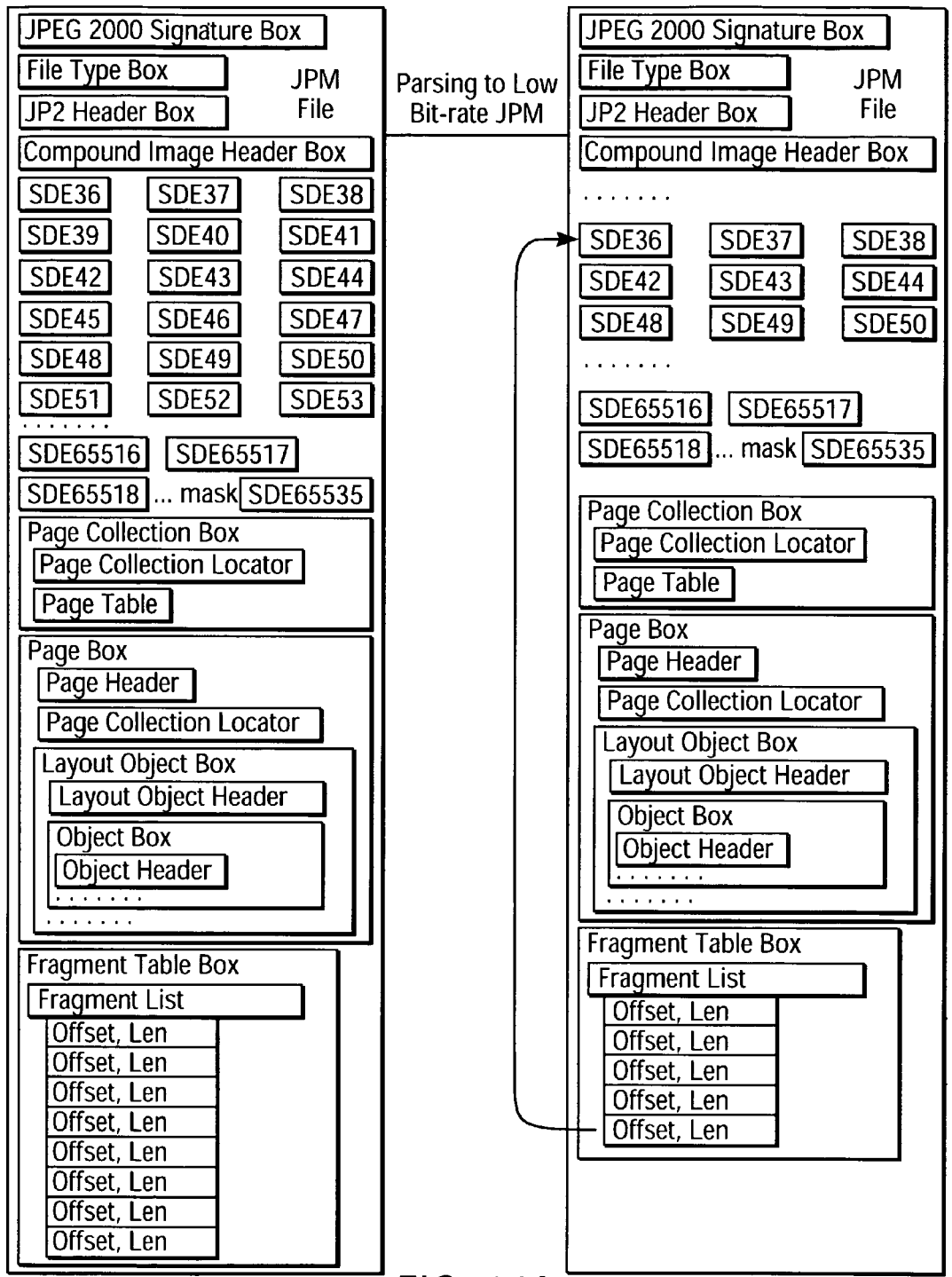
FIG. 14A is an example that shows parsing a lossless JPM file to a low bit-rate JPM file.

FIG. 14A shows an example of a parser taking a full resolution lossless JPM file and creating a full resolution lossy JPM file. The parser understands the contents of the SDE boxes either by the indexes or the metadata boxes that describe the contents or both. The SDE boxes containing the full resolution object masks and full resolution first layer packets for the images are selected for the new file. The Fragment Table box is edited to point to the new SDE box locations.

Page Description Example

Figure 14B:
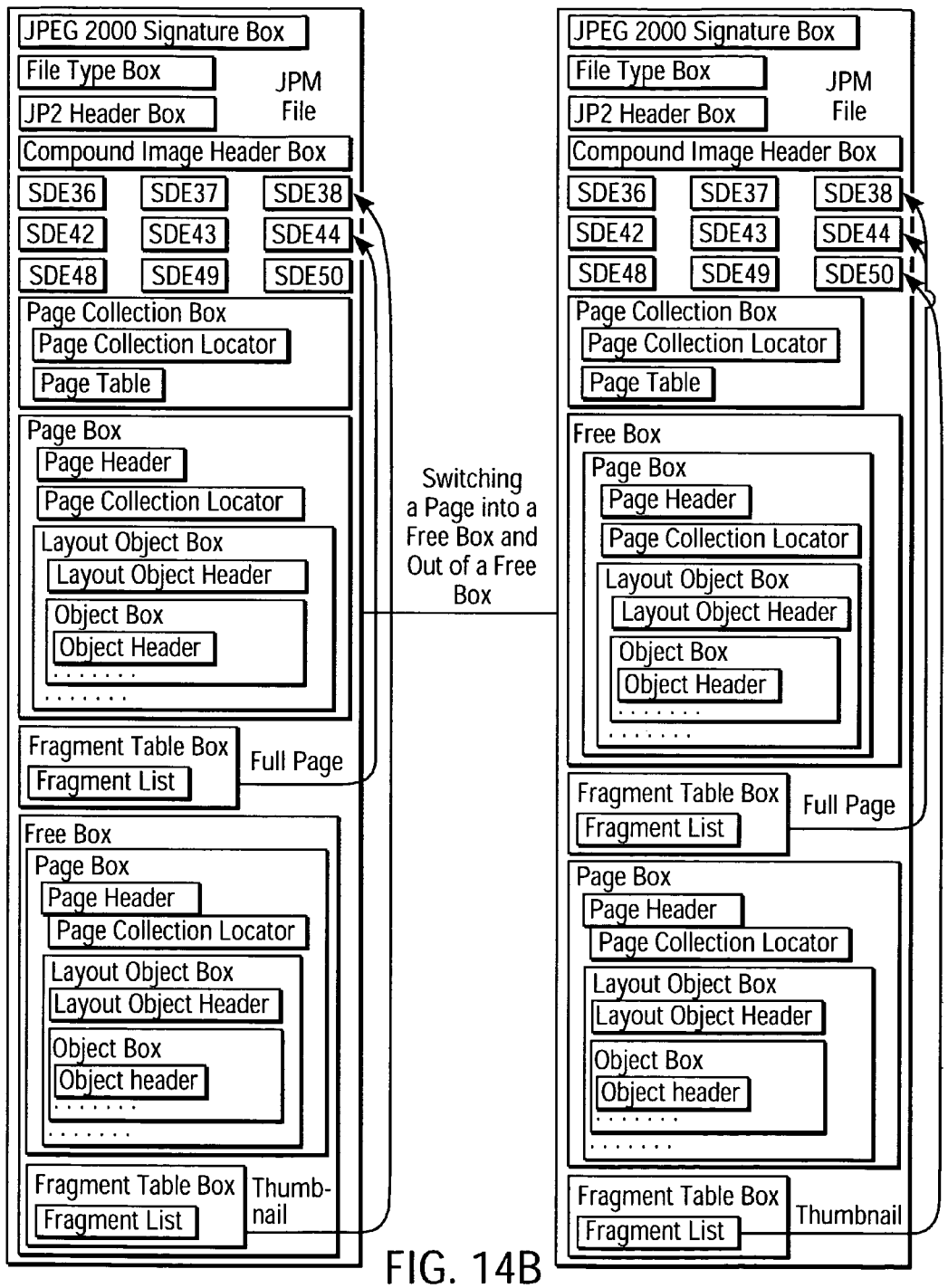
FIG. 14B is an example showing a parser switching a page into a free box and out of a free box.

FIG. 14B shows a JPM with two Page boxes. One of them is encapsulated in a Free box making it unusable for a generic decoder. The parser finds the Page box of interest, removes it from the Free box and encapsulates the other Page box in the Free box. Thus, the generic decoder now decodes the other Page box instead of the original. Note that a media data box may be used instead of a free box.

Note the length of the free box can be changed to be just 8 bytes long or as long as the Page box being hiding. There is no need to change the length of the file.

Figure 14C:
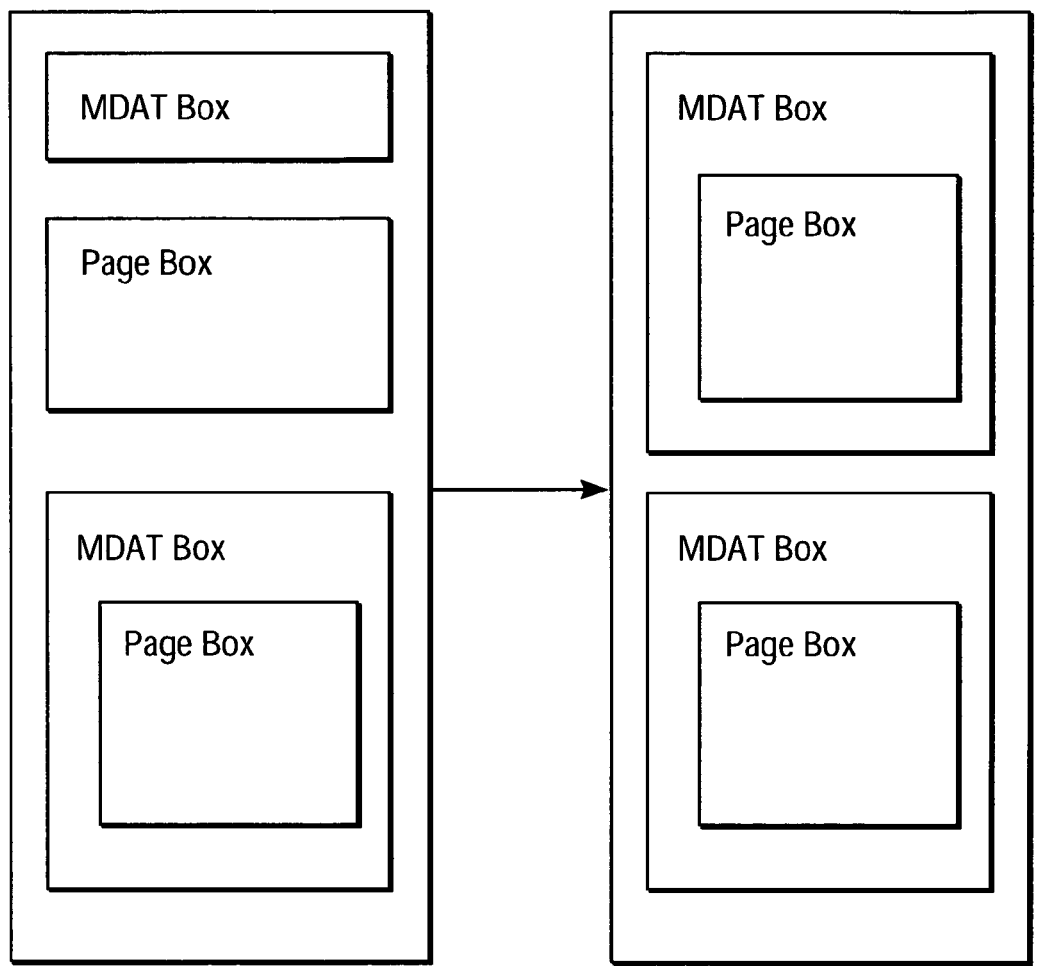
FIG. 14C illustrates a parser parsing a 2-page JPM file to a 1-page JPM file.
Figure 14D:
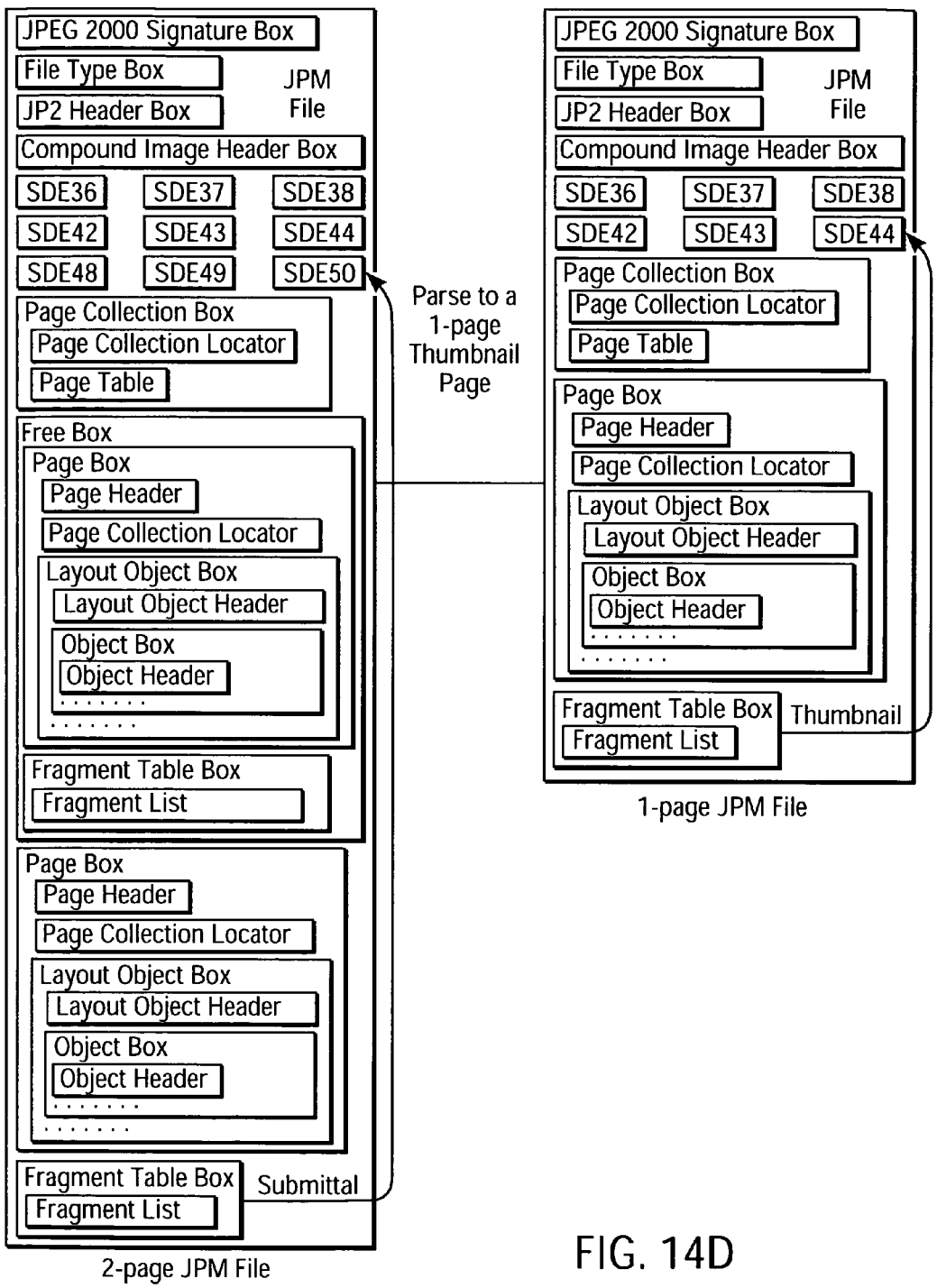
FIG. 14D is an example that shows parsing a 2-page JPM file into a consolidated 1-page JPM file.

FIG. 14C shows the same file as on the right side of FIG. 14B. Now the file is consolidated to its minimum form by removing all the unnecessary SDE and Page boxes and rewriting all the pointers appropriately.

The access features of JPEG 2000 can be preserved with the JPM format even if the object masks are compressed with older coding standards. The cost for this is fairly reasonable in terms of bits and the coding gain over JPEG 2000 is preserved. The Shared Data Box architecture of JPM makes access of both the mask and JPEG 2000 coded image codestreams straight forward.

An Exemplary Computer System

Figure 15:
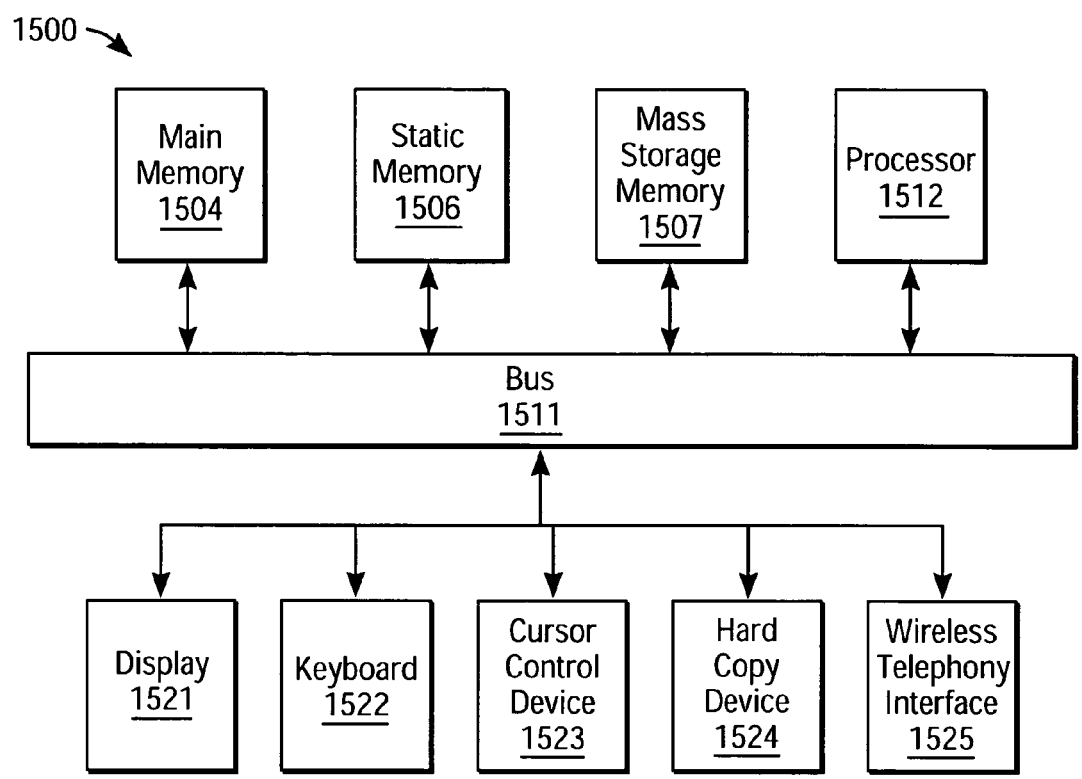
FIG. 15 is a block design of a computer system.

FIG. 15 is a block diagram of an exemplary computer system that may perform one or more of the operations described herein. Referring to FIG. 15, computer system 1500 may comprise an exemplary client 1550 or server 1500 computer system. Computer system 1500 comprises a communication mechanism or bus 1511 for communicating information, and a processor 1512 coupled with bus 1511 for processing information. Processor 1512 includes a microprocessor, but is not limited to a microprocessor, such as, for example, Pentium™, PowerPC™, Alpha™, etc.

System 1500 further comprises a random access memory (RAM), or other dynamic storage device 1504 (referred to as main memory) coupled to bus 1511 for storing information and instructions to be executed by processor 1512. Main memory 1504 also may be used for storing temporary variables or other intermediate information during execution of instructions by processor 1512.

Computer system 1500 also comprises a read only memory (ROM) and/or other static storage device 1506 coupled to bus 1511 for storing static information and instructions for processor 1512, and a data storage device 1507, such as a magnetic disk or optical disk and its corresponding disk drive. Data storage device 1507 is coupled to bus 1511 for storing information and instructions.

Computer system 1500 may further be coupled to a display device 1521, such as a cathode ray tube (CRT) or liquid crystal display (LCD), coupled to bus 1511 for displaying information to a computer user. An alphanumeric input device 1522, including alphanumeric and other keys, may also be coupled to bus 1511 for communicating information and command selections to processor 1512. An additional user input device is cursor control 1523, such as a mouse, trackball, trackpad, stylus, or cursor direction keys, coupled to bus 1511 for communicating direction information and command selections to processor 1512, and for controlling cursor movement on display 1521.

Another device that may be coupled to bus 1511 is hard copy device 1524, which may be used for printing instructions, data, or other information on a medium such as paper, film, or similar types of media. Furthermore, a sound recording and playback device, such as a speaker and/or microphone may optionally be coupled to bus 1511 for audio interfacing with computer system 1500. Another device that may be coupled to bus 1511 is a wired/wireless communication capability 1525 to communication to a phone or handheld palm device.

Note that any or all of the components of system 1500 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:

accessing image layering metadata information in a free box of a JPM file having a plurality of layout objects, wherein the image layering metadata information follows a marker that identifies a presence of layered image data in the JPM file, and wherein the image layering metadata information includes at least a page box index value indicative of a range of page boxes with layout objects from the plurality of layout objects to be used for image layering, a number of distinct groups of layout objects within the page boxes, and a number of layout objects that are contained within each of the distinct groups; and generating at least one image using the plurality of layout objects and based on the accessed image layering metadata information, wherein a first image corresponding to a first set of at least one of the layout objects of the plurality of layout objects is generated to occlude a second image corresponding to a second set of one or more layout objects in the plurality of layout objects for sequentially displaying the second image at a particular resolution and then displaying after a period of time the first image at a different resolution for display of increasing resolutions of the at least one image, wherein the first image and the second image in the sequential display correspond to distinct sets of layout objects in the plurality of layout objects displayed at different times, and wherein the plurality of layout objects include a third set of layout objects with a different level of security access than the first and second sets of layout objects, and further wherein the third set of layout objects is selectively displayed within the at least one image based on which application from a plurality of different applications is utilized to view the plurality of layout objects and a corresponding level of security access associated with the application.

2. The method defined in claim 1 wherein the plurality of layout objects are organized into a plurality of multiple page descriptions.

3. The method defined in claim 1 further comprising presenting the first and second sets of one or more layout objects in an order so that several images are presented in one page descriptions.

4. The method defined in claim 1 wherein a first set of one or more layout objects creates a thumbnail and a second set of one or more layout objects creates a full size page that occludes the thumbnail completely.

5. The method defined in claim 4 wherein JPM decoder areas of the organization of the JPM file is able to stop decoding after creation of the thumbnail.

6. The method defined in claim 4 wherein a generic JPM decoder decodes the first and second sets of one or more layout objects to display the full size page even though the full size page occludes the thumbnail.

7. The method defined in claim 1 wherein the JPM file is organized such that a generic JPM decoder decodes all sets of the one or more layout objects and only presents a final image.

8. The method defined in claim 7 wherein a JPM decoder that is aware of and is operable on the sets of one or more layout objects steps through the sets of layout objects.

9. The method defined in claim 1 wherein a portion of the plurality of layout objects corresponds to one or more words.

10. The method defined in claim 9 wherein generating the least one image comprises reflowing the portion of the plurality of layout objects based on an output device on which the portion of layout objects are to be displayed, wherein word layout objects are reflowed to display a determined number of words per line in the at least one image based on the display device.

11. The method defined in claim 9 wherein generating the at least one image comprises:
recognizing an output device type;
selecting a layout for the portion of the plurality of layout objects of the at least one image based on the recognized output device type;
determining a repositioning of the portion of the plurality of layout objects relative to one another based on the selected layout; and
reflowing the portion of the plurality of layout objects for the layout based on the determined repositioning.

12. The method defined in claim 1 wherein a portion of the plurality of layout objects are for layered spatial information.

13. The method defined in claim 12 wherein the spatial information includes map information, demographic information, satellite information, and medical images.

14. The method defined in claim 1 wherein a portion of the plurality of layout objects are for one or more of roads, lakes, mountain forests, parks, and airports.

15. The method defined in claim 1 wherein each of the first and second sets are processed separately in parallel.

16. The method defined in claim 1 wherein one or more editing layout objects of the plurality of layout objects comprise at least one edit to be applied to an original image, and wherein generating the at least one image comprises generating the original image from the JPM file with the one or more editing layout objects occluding portions of the original image to give the appearance that at least one edit are made on the original image.

17. The method defined in claim 1 wherein the plurality of layout objects comprises a form when displayed.

18. The method defined in claim 17 wherein the third set of layout objects is encrypted in the JPM file, and unencrypted for display within the form by the application with the corresponding level of security access.

19. The method defined in claim 18 wherein the JPM file includes one or more pointers to non-encrypted files.

20. A non-transitory computer readable storage medium with executable instructions stored thereon which, when executed by a system, cause the system to perform a method comprising:
accessing image layering metadata information in a free box of a JPM file having a plurality of layout objects, wherein the image layering metadata information follows a marker that identifies a presence of layered image data in the JPM file, and wherein the image layering metadata information includes at least a page box index value indicative of a range of page boxes with layout objects from the plurality of layout objects to be used for image layering, a number of distinct groups of layout objects within the page boxes, and a number of layout objects that are contained within each of the distinct groups; and
generating at least one image using the plurality of layout objects and based on the accessed image layering metadata information, wherein a first image corresponding to a first set of at least one of the layout objects of the plurality of layout objects is generated to occlude a second image corresponding to a second set of one or more layout objects in the plurality of layout objects for sequentially displaying the second image at a particular resolution and then displaying after a period of time the first image at a different resolution for display of increasing resolutions of the at least one image, wherein the first image and the second image in the sequential display correspond to distinct sets of layout objects in the plurality of layout objects displayed at different times, and wherein the plurality of layout objects include a third set of layout objects with a different level of security access than the first and second sets of layout objects, and further wherein the third set of layout objects is selectively displayed within the at least one image based on which application from a plurality of different applications is utilized to view the plurality of layout objects and a corresponding level of security access associated with the application.

21. The computer readable storage medium defined in claim 20 wherein the plurality of layout objects are organized into a plurality of multiple page descriptions.

22. The computer readable storage medium defined in claim 20 wherein the method further comprises presenting the first and second sets of one or more layout objects in an order so that several images are presented in one page descriptions.

23. The computer readable storage medium defined in claim 20 wherein a first set of one or more layout objects creates a thumbnail and a second set of one or more layout objects creates a full size page that occludes the thumbnail completely.

24. The computer readable storage medium defined in claim 23 wherein JPM decoder areas of the organization of the JPM file is able to stop decoding after creation of the thumbnail.

25. The computer readable storage medium defined in claim 23 wherein a generic JPM decoder decodes the first and second sets of one or more layout objects to display the full size page even though the full size page occludes the thumbnail.

26. The computer readable storage medium defined in claim 20 wherein the JPM file is organized such that a generic JPM decoder decodes all sets of the one or more layout objects and only presents a final image.

27. The computer readable storage medium defined in claim 26 wherein a JPM decoder that is aware of and is operable on the sets of one or more layout objects steps through the sets of layout objects.

28. The computer readable storage medium defined in claim 20 wherein a portion of the plurality of layout objects corresponds to one or more words.

29. The computer readable storage medium defined in claim 28 wherein generating the least one image comprises reflowing the portion of the plurality of layout objects based on an output device on which the portion of layout objects are to be displayed, wherein word layout objects are reflowed to display a determined number of words per line in the at least one image based on the display device.

30. The computer readable storage medium defined in claim 28 wherein generating the at least one image comprises:
   recognizing an output device type;
   selecting a layout for the portion of the plurality of layout objects of the at least one image based on the recognized output device type;
   determining a repositioning of the portion of the plurality of layout objects relative to one another based on the selected layout; and
   reflowing the portion of the plurality of layout objects for the layout based on the determined repositioning.

31. The computer readable storage medium defined in claim 20 wherein a portion of the plurality of layout objects are for layered spatial information.

32. The computer readable storage medium defined in claim 31 wherein the spatial information includes map information, demographic information, satellite information, and medical images.

33. The computer readable storage medium defined in claim 20 wherein a portion of the plurality of layout objects are for one or more of roads, lakes, mountain forests, parks, and airports.

34. The computer readable storage medium defined in claim 20 wherein each of the first and second sets are processed separately in parallel.

35. The computer readable storage medium defined in claim 20 wherein one or more editing layout objects of the plurality of layout objects comprise at least one edit to be applied to an original image, and wherein generating the at least one image comprises generating the original image from the JPM file with the one or more editing layout objects occluding portions of the original image to give the appearance that at least one edit are made on the original image.

36. The computer readable storage medium defined in claim 20 wherein the plurality of layout objects comprises a form when displayed.

37. The computer readable storage medium defined in claim 20 wherein the third set of layout objects is encrypted in the JPM file.

38. The computer readable storage medium defined in claim 37 wherein the JPM file includes one or more pointers to non-encrypted files.

39. An apparatus comprising:
   A processor;
   a JPM decoder executed by the processor to access image layering metadata information in a free box of a JPM file having a plurality of layout objects, wherein the image layering metadata information follows a marker that identifies a presence of layered image data m the JPM file, and wherein the image layering metadata information includes at least a page box index value indicative of a range of page boxes with layout objects from the plurality of layout objects to be used for image layering, a number of distinct groups of layout objects within the page boxes, and a number of layout objects that are contained within each of the distinct groups, the JPM decoder including a renderer to generate and display at least one image using the plurality of layout objects and based on the accessed image layering metadata information on a display device coupled with the renderer, wherein a first image corresponding to a first set of at least one of the layout objects of the plurality of layout objects is generated to occlude a second image corresponding to a second set of one or more layout objects m the plurality of layout objects for sequentially displaying after a period of time the second images at a particular resolution and then displaying the first image at a different resolution for display of increasing resolutions of the at least one image, wherein the first image and the second image m the sequential display correspond to distinct sets of layout objects m the plurality of layout objects displayed at different times, and wherein the plurality of layout objects include a third set of layout objects with a different level of security access than the first and second sets of layout objects, and further wherein the third set of layout objects is selectively displayed within the at least one image based on which application from a plurality of different applications is utilized to view the plurality of layout objects and a corresponding level of security access associated with the application.

40. The apparatus defined in claim 39 wherein the plurality of layout objects is organized into a plurality of multiple page descriptions.

41. The apparatus defined in claim 39 further comprising presenting the first and second sets of one or more layout objects in an order so that several images are presented in one page descriptions.

42. The apparatus defined in claim 39 wherein a first set of one or more layout objects creates a thumbnail and a second set of one or more layout objects creates a full size page that occludes the thumbnail completely.

43. The apparatus defined in claim 42 wherein the JPM decoder is able to stop decoding after creation of the thumbnail.

44. The apparatus defined in claim 42 wherein the JPM decoder comprises a generic JPM decoder that decodes the first and second sets of one or more layout objects to display the full size page even though the full size page occludes the thumbnail.

45. The apparatus defined in claim 39 wherein the JPM file is organized such that a generic JPM decoder decodes all sets of the one or more layout objects and only presents a final image.

46. The apparatus defined in claim 45 wherein the JPM decoder is aware of and is operable on the sets of one or more layout objects steps through the sets of layout objects.

47. The apparatus defined in claim 39 wherein a portion of the plurality of layout objects correspond to one or more words.

48. The apparatus defined in claim 47 wherein the renderer generates the least one image by reflowing the portion of the plurality of layout objects based on an output device on which the portion of layout objects are to be displayed, wherein word layout objects are reflowed to display a determined number of words per line in the at least one image based on the display device.

49. The apparatus defined in claim 47 wherein the renderer generates the at least one image by
　recognizing an output device type;
　selecting a layout for the portion of the plurality of layout objects of the at least one image based on the recognized output device type;
　determining a repositioning of the portion of the plurality of layout objects relative to one another based on the selected layout; and
　reflowing the portion of the plurality of layout objects for the layout based on the determined repositioning.

50. The apparatus defined in claim 39 wherein a portion of the plurality of layout objects are for layered spatial information.

51. The apparatus defined in claim 50 wherein the spatial information includes map information, demographic information, satellite information, and medical images.

52. The apparatus defined in claim 39 wherein a portion of the plurality of layout objects are for one or more of roads, lakes, mountain forests, parks, and airports.

53. The apparatus defined in claim 39 wherein each of the first and second sets are processed separately in parallel.

54. The apparatus defined in claim 39 wherein one or more editing layout objects of the plurality of layout objects comprise at least one edit to be applied to an original image, and wherein generating the at least one image comprises generating the original image from the JPM file with the one or more editing layout objects occluding portions of the original image to give the appearance that at least one edit are made on the original image.

55. The apparatus defined in claim 39 wherein the plurality of layout objects comprise a form when displayed.

56. The apparatus defined in claim 39 wherein the third set of layout objects is encrypted in the JPM file.

57. The apparatus defined in claim 56 wherein the JPM file includes one or more pointers to non-encrypted files.

58. An apparatus comprising:
　A memory;
　　means for accessing, from the memory, image layering metadata information in a free box of a JPM file having a plurality of layout objects, wherein the image layering metadata information follows a marker that identifies a presence of layered image data in the JPM file, and wherein the image layering metadata information includes at least a page box index value indicative of a range of page boxes with layout objects from the plurality of layout objects to be used for image layering, a number of distinct groups of layout objects within the page boxes, and a number of layout objects that are contained within each of the distinct groups; and
　means for generating at least one image using the plurality of layout objects and based on the accessed image layering metadata information for display on a display device coupled with the apparatus, wherein a first image corresponding to a first set of at least one of the layout objects of the plurality of layout objects is generated to occlude a second image corresponding to a second set of one or more layout objects in the plurality of layout objects for sequentially displaying after a period of time the second image at a particular resolution and then displaying the first image at a different resolution for display of increasing resolutions of the at least one image, wherein the first image and the second image in the sequential display correspond to distinct sets of layout objects in the plurality of layout objects displayed at different times, and wherein the plurality of layout objects include a third set of layout objects with a different level of security access than the first and second sets of layout objects, and further wherein the third set of layout objects is selectively displayed within the at least one image based on which application from a plurality of different applications is utilized to view the plurality of layout objects and a corresponding level of security access associated with the application.

* * * * *